United States Patent
Mantripragada et al.

(10) Patent No.: US 9,940,114 B2
(45) Date of Patent: *Apr. 10, 2018

(54) SEAL-BASED REGULATION FOR SOFTWARE DEPLOYMENT MANAGEMENT

(71) Applicant: INTERNATIONAL BUSINESS MACHINES CORPORATION, Armonk, NY (US)

(72) Inventors: Nagesh K. Mantripragada, Bangalore (IN); Ashish Mungi, Bangalore (IN); Manjit S. Sodhi, Bangalore (IN); Ram Viswanathan, Plano, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/168,708

(22) Filed: May 31, 2016

(65) Prior Publication Data

US 2016/0274880 A1    Sep. 22, 2016

Related U.S. Application Data

(63) Continuation of application No. 14/153,215, filed on Jan. 13, 2014, now Pat. No. 9,383,984.

(51) Int. Cl.
*G06F 9/445* (2006.01)
*G06F 11/36* (2006.01)
(Continued)

(52) U.S. Cl.
CPC .................. *G06F 8/60* (2013.01); *G06F 8/61* (2013.01); *G06F 11/3616* (2013.01); *G06F 21/121* (2013.01); *G06F 8/71* (2013.01)

(58) Field of Classification Search
None
See application file for complete search history.

(56) References Cited

U.S. PATENT DOCUMENTS 6,880,086 B2    4/2005  Kidder et al.
7,069,541 B2 *  6/2006  Dougherty ................ G06F 8/20
                                                     717/121

(Continued)

OTHER PUBLICATIONS

Flexera Software AdminStudio; URL: http://www.flexerasoftware.com/products/adminsstudio.htm; retrieved from the Internet Jun. 13, 2013; 2 pages.

(Continued)

*Primary Examiner* — Isaac T Tecklu
(74) *Attorney, Agent, or Firm* — Schmeiser, Olsen & Watts; John Pivnichny

(57) ABSTRACT

An approach is provided for managing a deployment of a software package. First and second quality assurance (QA) seals are determined to match exactly one QA seal and no QA seal, respectively, in a plurality of QA seals. First details about hardware, middleware, and applications required in a first environment, which are included in the first QA seal, are determined to match second details of the first environment. Based on the first QA seal matching exactly one QA seal and the first details matching the second details, the software package is determined to be compatible with the first environment and a notification is generated authorizing the deployment of the software package to the first environment. Based on the second QA seal not matching any of the plurality of QA seals, a notification is generated indicating that the deployment of the software package to a second environment is not authorized.

20 Claims, 15 Drawing Sheets

(51) Int. Cl.
  *G06F 21/12* (2013.01)
  *G06F 9/44* (2018.01)

(56) References Cited

U.S. PATENT DOCUMENTS

| | | | |
|---|---|---|---|
| 7,757,214 B1 | 7/2010 | Palczak et al. | |
| 7,761,851 B2 | 7/2010 | Bailey et al. | |
| 7,856,631 B2* | 12/2010 | Brodkorb | G06F 8/61 717/174 |
| 7,950,010 B2 | 5/2011 | Goger et al. | |
| 7,996,814 B1 | 8/2011 | Qureshi et al. | |
| 8,306,946 B2* | 11/2012 | Bansode | G06F 17/30923 707/609 |
| 2002/0087734 A1* | 7/2002 | Marshall | G06F 9/50 719/310 |
| 2003/0182652 A1* | 9/2003 | Custodio | G06F 8/61 717/122 |
| 2005/0262503 A1 | 11/2005 | Kane | |
| 2006/0101462 A1* | 5/2006 | Spears | G06F 8/61 717/177 |
| 2006/0136892 A1 | 6/2006 | Branch et al. | |
| 2006/0168581 A1 | 7/2006 | Goger et al. | |
| 2007/0226679 A1 | 9/2007 | Jayamohan et al. | |
| 2007/0240194 A1 | 10/2007 | Hargrave et al. | |
| 2008/0222604 A1* | 9/2008 | Murphy | G06F 8/61 717/120 |
| 2009/0217163 A1* | 8/2009 | Jaroker | G06F 8/60 715/700 |
| 2013/0061209 A1 | 3/2013 | Lam | |
| 2013/0152047 A1* | 6/2013 | Moorthi | G06F 11/368 717/124 |
| 2014/0130036 A1 | 5/2014 | Gurikar et al. | |
| 2014/0189680 A1 | 7/2014 | Kripalani | |
| 2014/0259003 A1 | 9/2014 | Devarajan et al. | |
| 2015/0199188 A1 | 7/2015 | Mantripragada | |

OTHER PUBLICATIONS

Hou et al.; ADEM: Automating Deployment and Management of Application Software on the Open Science Grid; 10th IEEE/ACM International Conference on Grid Computing; Aug. 2009; pp. 130-137.

IBM Rational Automation Framework (RAF); URL: http://www-01.ibm.com/software/rational/products/framework/; retrieved from the Internet Jun. 13, 2013.

IBM Rational Build Forge; URL: http:/www-01.ibm.com/software/awdtools/buildforge/; retrieved from the Internet Jun. 13, 2013; 1 page.

IBM Rational Team Concert (RTC); URL: https://jaz.net/projects/rational-team-concert/; retrieved from the Internet Jun. 13, 2013; 3 pages.

IBM Tivoli Provisioning Manager (TPM); URL: http://www-01.ibm.com/software/tivoli/products/prov-mgr/; retrieved from the Internet Jun. 13, 2013; 2 pages.

IBM Workload Deployer; URL: http://www-01.ibm.com/software/webservers/workload-deployer/; retrieved from the Internet Jun. 13, 2013; 2 pages.

Microsoft System Center Configuration Manager; URL: http://www.microsoft.com/en-us/server-cloud/system-center/configuration-manager-2012.aspx; retrieved from the Internet Jun. 13, 2013; 5 pages.

OutSystems Platform; URL: http://www.outsystems.com/platform/#_; retrieved from the Internet Jun. 10, 2013; 5 pages.

Ruiz et al.; Model-Based Context-Aware Deployment of Distributed Systems; IEEE Communications Magazine; Jun. 2009; pp. 164-171.

Office Action (dated Sep. 1, 2015) for U.S. Appl. No. 14/153,215; Filing Date Jan. 13, 2014; Confirmation No. 9132.

ThoughtWorks Studios; Fail fast to learn fast in your build-test-release workflow; URL: http//www.thoughtworks-studios.com/go-continuous-delivery/; retrieved from the Internet Jun. 13, 2013; 3 pages.

Amendment filed Jan. 4, 2016 in response to Office Action (dated Sep. 1, 2015) for U.S. Appl. No. 14/153,215; Filing Date Jan. 13, 2014; Confirmation No. 9132.

Notice of Allowance (dated Apr. 1, 2016) for U.S. Appl. No. 14/153,215; Filing Date Jan. 13, 2014; Confirmation No. 9132.

* cited by examiner

SEAL-BASED REGULATION FOR SOFTWARE DEPLOYMENT MANAGEMENT

This application is a continuation application claiming priority to Ser. No. 14/153,215 filed Jan. 13, 2014, now U.S. Pat. No. 9,383,984, issued Jul. 5, 2016.

TECHNICAL FIELD

The present invention relates to a data processing method and system for managing software deployment, and more particularly to a technique for software token-based software deployment management.

BACKGROUND

Known techniques of verifying and regulating software package deployment are based on a manual confirmation of quality checks by using e-mail or log-based tools that record the input and output of each quality stage and quality gate. The manual verification for complex software package deployments is tedious and time-consuming. Because of dependencies between target environments, the failure of software deployment to one target environment causes related failures in the deployment to other target environments. In a cloud-based or virtualized environment, known software deployment approaches are manual and allow unverified software packages to be deployed to target virtualized environments. The auditing of software deployments using existing approaches is reactive and costly in terms of time, money, tracking accuracy and reliability.

BRIEF SUMMARY

In a first embodiment, the present invention provides a method of managing a deployment of a software package. The method includes a computer retrieving from a first data repository a software package and retrieving a quality assurance (QA) seal associated with the software package in the first data repository. The QA seal is a data structure. The method further includes the computer verifying the QA seal by finding the QA seal in a second data repository that stores a plurality of QA seals. The method further includes the computer obtaining a target deployment environment for the deployment of the software package. The method further includes the computer reading a first profile in the QA seal. The first profile specifies an environment for the deployment of the software package. The method further includes the computer determining the target deployment environment matches the environment specified by the first profile in the QA seal. The method further includes, based on the target deployment environment matching the environment specified by the first profile in the QA seal, the computer determining the QA seal indicates the software package is compatible with the target deployment environment. The method further includes the computer reading a second profile in the QA seal. The second profile specifies dependencies of hardware and software required in the deployment of the software package. The method further includes the computer determining the dependencies are satisfied based on the environment specified by the first profile in the QA seal. The method further includes the computer reading metadata in the QA seal. The metadata specifies the software package is approved for a release to the environment specified by the first profile in the QA seal. The method further includes, based on the software package being compatible with the target deployment environment, the dependencies being satisfied, and the software package being approved for the release to the environment, the computer generating a notification of an authorization of the deployment of the software package to the target deployment environment.

In a second embodiment, the present invention provides a computer system including a central processing unit (CPU); a memory coupled to the CPU; and a computer-readable, tangible storage device coupled to the CPU. The storage device includes instructions that are executed by the CPU via the memory to implement a method of managing a deployment of a software package. The method includes the computer system retrieving from a first data repository a software package and retrieving a quality assurance (QA) seal associated with the software package in the first data repository. The QA seal is a data structure. The method further includes the computer system verifying the QA seal by finding the QA seal in a second data repository that stores a plurality of QA seals. The method further includes the computer system obtaining a target deployment environment for the deployment of the software package. The method further includes the computer system reading a first profile in the QA seal. The first profile specifies an environment for the deployment of the software package. The method further includes the computer system determining the target deployment environment matches the environment specified by the first profile in the QA seal. The method further includes, based on the target deployment environment matching the environment specified by the first profile in the QA seal, the computer system determining the QA seal indicates the software package is compatible with the target deployment environment. The method further includes the computer system reading a second profile in the QA seal. The second profile specifies dependencies of hardware and software required in the deployment of the software package. The method further includes the computer system determining the dependencies are satisfied based on the environment specified by the first profile in the QA seal. The method further includes the computer system reading metadata in the QA seal. The metadata specifies the software package is approved for a release to the environment specified by the first profile in the QA seal. The method further includes, based on the software package being compatible with the target deployment environment, the dependencies being satisfied, and the software package being approved for the release to the environment, the computer system generating a notification of an authorization of the deployment of the software package to the target deployment environment.

In a third embodiment, the present invention provides a computer program product including a computer-readable, tangible storage device and a computer-readable program code stored in the computer-readable, tangible storage device. The computer-readable program code includes instructions that are executed by a central processing unit (CPU) of a computer system to implement a method of managing a deployment of a software package. The method includes the computer system retrieving from a first data repository a software package and retrieving a quality assurance (QA) seal associated with the software package in the first data repository. The QA seal is a data structure. The method further includes the computer system verifying the QA seal by finding the QA seal in a second data repository that stores a plurality of QA seals. The method further includes the computer system obtaining a target deployment environment for the deployment of the software package. The method further includes the computer system reading a first profile in the QA seal. The first profile specifies an environment for the deployment of the software package.

The method further includes the computer system determining the target deployment environment matches the environment specified by the first profile in the QA seal. The method further includes, based on the target deployment environment matching the environment specified by the first profile in the QA seal, the computer system determining the QA seal indicates the software package is compatible with the target deployment environment. The method further includes the computer system reading a second profile in the QA seal. The second profile specifies dependencies of hardware and software required in the deployment of the software package. The method further includes the computer system determining the dependencies are satisfied based on the environment specified by the first profile in the QA seal. The method further includes the computer system reading metadata in the QA seal. The metadata specifies the software package is approved for a release to the environment specified by the first profile in the QA seal. The method further includes, based on the software package being compatible with the target deployment environment, the dependencies being satisfied, and the software package being approved for the release to the environment, the computer system generating a notification of an authorization of the deployment of the software package to the target deployment environment.

Embodiments of the present invention provide intelligent software package deployment to any target environment, by allowing proactive and automated verification of software packages prior to actual deployment, thereby facilitating the prevention of any unauthorized, unqualified, and unverified deployments. In critical and complex environments, embodiments described herein reduces manual verification and regulation during software package deployment, thereby increasing the quality and reliability of the end-to-end deployment process. In cloud-based or virtualized environments, embodiments described herein provide effective automated regulation and management of deployments of virtual image(s), software packages, or software update(s) to multiple distributed target environments. Furthermore, embodiments of the present invention augment existing software development lifecycle (SDLC) processes, thereby making Quality Assurance, Change and Configuration Management processes more robust and automated.

DETAILED DESCRIPTION

Overview

Embodiments of the present invention provide a quality assurance (QA) and verification approach for intelligent regulation of software package deployments to target environments which is based on QA seals. The verification of a software package deployment is performed proactively, automatically, and prior to the actual deployment of the software package. A QA seal is a data structure providing an intelligent software token. The data structure of a QA seal includes a security token, a software package profile, an environment profile, a user profile, and related metadata, and may optionally include software lifecycle phases for which the QA seal is generated, a workflow profile, and a dependency profile. A QA seal can be generated, updated, stored, read, verified, and deleted, as well as be associated with or disassociated from software packages. Embodiments described herein provide processes and algorithms for using QA seals in any combination of the build, test, and deploy phases of the SDLC for automated verification of software packages, thereby providing smarter deployment management. For example, SDLC processes may be updated by (1) using a QA seal for the final release package only; (2) using different QA seals for the build package, test package, and final release package; or (3) using the same QA seal and updating the QA seal for the build package, the test package, and the final release package. Furthermore, embodiments of the present invention utilize QA seals to determine whether a software package is suitable for deployment to a target deployment environment.

System for QA-Seal Based Software Deployment Management

Figure 1:
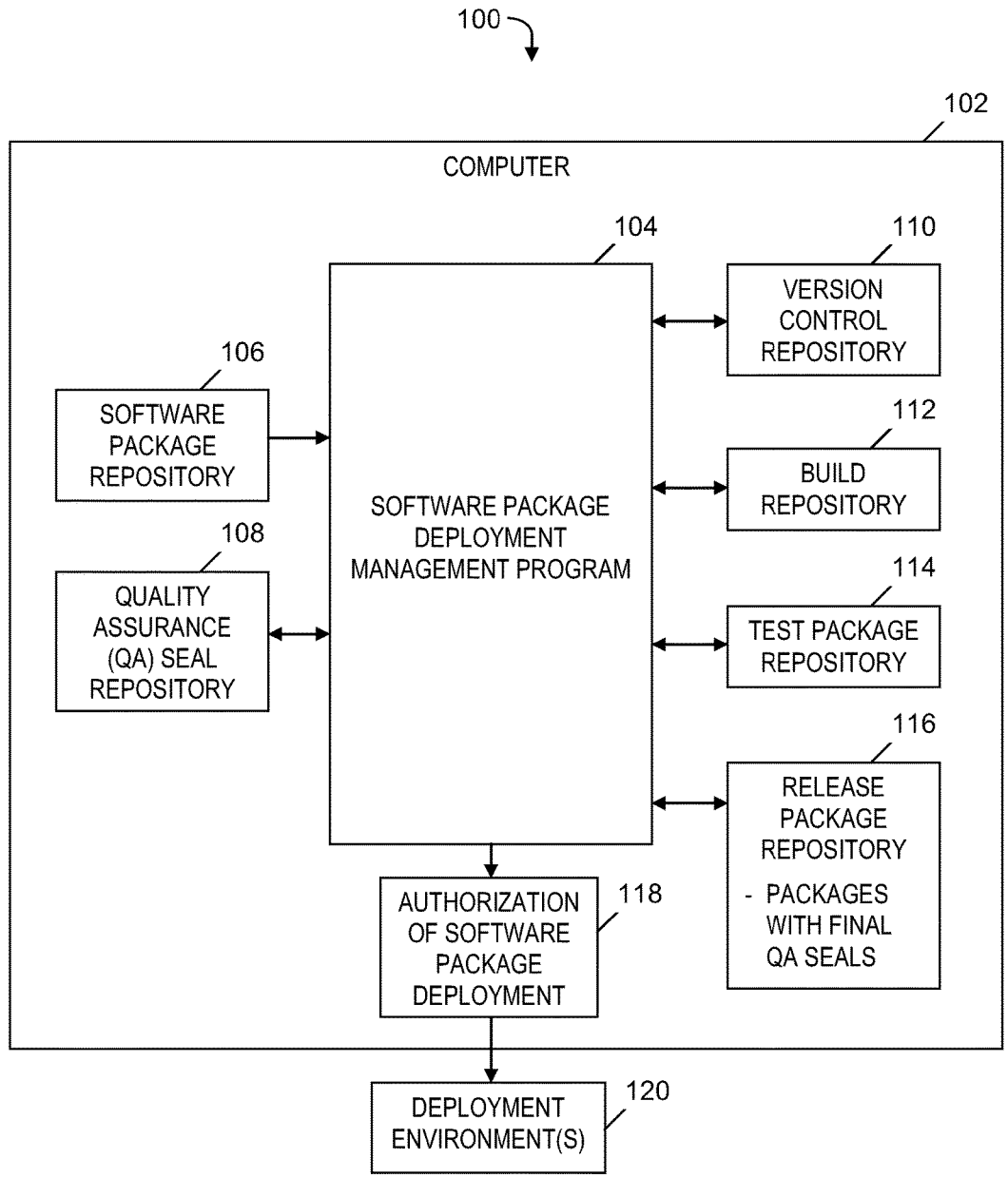
FIG. 1 is a block diagram of a system for managing software package deployment, in accordance with embodiments of the present invention.

FIG. 1 is a block diagram of a system for managing software package deployment, in accordance with embodiments of the present invention. A system 100 includes a computer 102, which executes a software package deployment management program 104 to manage software package deployment using QA seals. A QA seal is a data structure embedded in a software package, which provides a signature or security token, along with other profile data and metadata, used to automatically validate a software package and its contents and to deploy the software package to relevant target environments. A software package is software deployed to multiple computers or multiple distributed target computing environments, such as cloud-based or virtualized environments. For example, the software package may be an installer in an .exe or .zip file.

Software package deployment management program 104 retrieves software packages from a software package repository 106 and performs lookups of QA seals in a QA seal repository 108. Repository 108 may be a local repository which is specific to a particular environment or a global repository residing at an enterprise level or across enterprises, which can be similar to a Lightweight Directory Access Protocol (LDAP) registry or a Universal Description Discovery and Integration (UDDI) registry. Further, software package deployment management program 104 populates a version control repository 110 with source code check-in and baseline provided by development teams, a build repository 112 with build software packages, a test package repository 114 with test software packages, and a release package repository 116 with release software packages.

In one embodiment, system 100 provides a QA seal-based verification of the build phase of SDLC, for which build repository 112 includes the build software packages along with their corresponding build QA seals.

In one embodiment, system 100 includes a QA seal-based verification of the test phase of SDLC, for which test package repository 114 includes the test software packages along with their corresponding test QA seals.

In one embodiment, system 100 includes a QA seal-based verification of the deploy phase of SDLC, for which release package repository 116 includes the release software packages along with their corresponding final QA seals.

Software package deployment management program 104 performs the QA seal-based verification of a software package in one or more phases of SDLC and if the software package is verified, then software package deployment management program 104 generates an authorization 118 of the software package deployment to deployment environment(s) 120.

The functionality of the components of FIG. 1 is described in more detail in the discussion presented below relative to FIG. 2, FIG. 3, FIG. 4, FIG. 5, FIG. 6, FIG. 7, FIG. 8, FIG. 10, FIGS. 11A-11B and FIGS. 12A-12B.

Processes and Data Structure for QA-Seal Based Software Deployment Management

Figure 2:
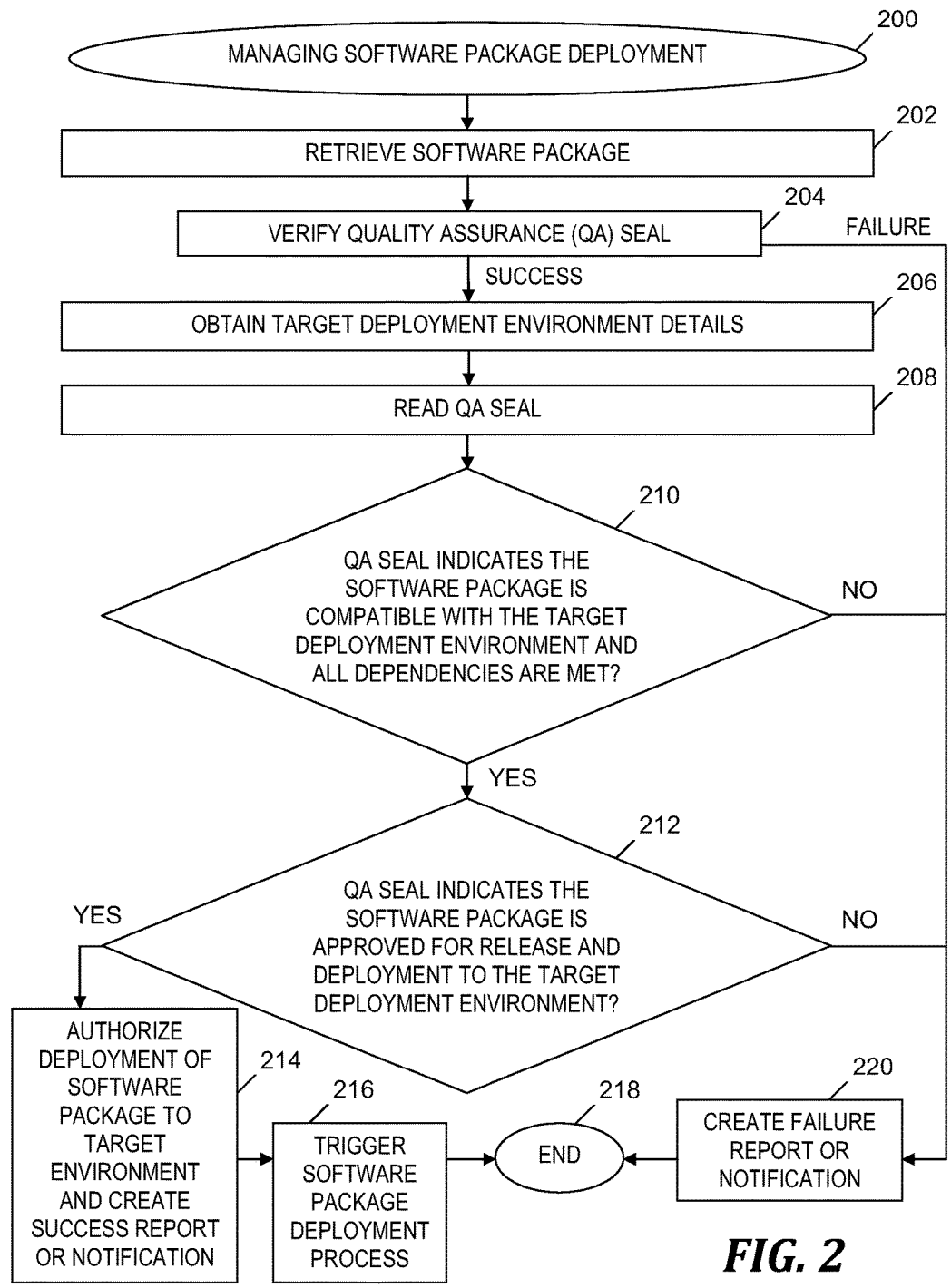
FIG. 2 is a flowchart of a process of managing software package deployment, where the process is implemented in the system of FIG. 1, in accordance with embodiments of the present invention.

FIG. 2 is a flowchart of a process of managing software package deployment, where the process is implemented in the system of FIG. 1, in accordance with embodiments of the present invention. The process of FIG. 2 starts at step 200. In step 202, software package deployment management program 104 (see FIG. 1) retrieves a software package and its corresponding QA seal from software package repository 106 (see FIG. 1).

In step 204, software package deployment management program 104 (see FIG. 1) verifies that the QA seal retrieved in step 202 matches an existing QA seal included in QA seal repository 108 (see FIG. 1). The verification process in step 204 is described in more detail in the discussion relative to FIG. 7, which is presented below. If QA seal retrieved in step 202 is successfully verified in step 204, then step 206 is performed.

In step 206, software package deployment management program 104 (see FIG. 1) obtains details about a target deployment environment. In one embodiment, the details include identification of the hardware and software included in the target deployment environment, license information, and other parameters.

In step 208, software package deployment management program 104 (see FIG. 1) reads the profile data and metadata included in the QA seal retrieved in step 202. The profile data and metadata are described below relative to FIG. 3.

In step 210, software package deployment management program 104 (see FIG. 1) determines whether the QA seal retrieved in step 202 indicates the software package is compatible with the target deployment environment whose details were obtained in step 206. Compatibility with the target deployment environment is based on data in an environment profile included in the QA seal matching data included in the target deployment environment details obtained in step 206, thereby indicating that the environment specified by the environment profile and the target deployment environment are identical.

For example, consider a software package intended for deployment to Environment 1 based on Operating System 1, whereas there is an attempt to deploy the software package to Environment 2 (i.e., the target deployment environment) based on Operating System 2. In this example, the QA seal retrieved in step 202 and corresponding to the software package indicates Environment 1, which fails to match Environment 2 specified in the details obtained in step 206. Because of the environments do not match, step 210 determines the software package is not compatible with the target deployment environment.

Also in step 210, software package deployment management program 104 (see FIG. 1) determines whether all dependencies identified in a dependency profile included in the QA seal are satisfied. The dependency profile specifies hardware and software dependencies and pre-requisites for successful deployment of the software package.

If software package deployment management program 104 (see FIG. 1) determines in step 210 that the QA seal indicates the software package is compatible with the target deployment environment and all the aforementioned dependencies are satisfied, then the Yes branch of step 210 is taken and step 212 is performed.

In step 212, software package deployment management program 104 (see FIG. 1) determines whether the QA seal retrieved in step 202 indicates the software package is approved for release and deployment to the target deployment environment obtained in step 206. If software package deployment management program 104 (see FIG. 1) determines in step 212 that the QA seal indicates the software package is approved for release to the target deployment environment, then the Yes branch of step 212 is taken and step 214 is performed.

Whether the software package is approved for release to the target deployment environment is based on data in a workflow profile and in software lifecycle phase(s) included in the QA seal retrieved in step 202. The workflow profile includes an indication of the software package being approved for release to a particular environment. The software lifecycle phase(s) specify the phase of the particular environment to which the software package is approved for release. For example, if the QA seal indicates a software package is approved for release in a development environment, but the target deployment environment is a production environment, then step 212 determines the mismatch between the development environment and the production environment, thereby determining the QA seal indicates that the software package is not approved for release to the target deployment environment.

In step 214, software package deployment management program 104 (see FIG. 1) authorizes deployment of the software package to the target deployment environment and creates a success report or notification indicating the authorized deployment of the software package.

In step 216, software package deployment management program 104 (see FIG. 1) triggers a process of deploying the software package. The process of FIG. 2 ends at step 218.

Returning to step 204, if QA seal retrieved in step 202 is not successfully verified, then step 220 is performed. In step 220, software package deployment management program 104 (see FIG. 1) creates a failure report or notification indicating that the deployment of the software package is not authorized. Following step 220, the process of FIG. 2 ends at step 218.

Returning to step 210, if software package deployment management program 104 (see FIG. 1) determines the QA seal indicates the software package is not compatible with the target deployment environment and/or determines that not all the aforementioned dependencies are satisfied, then the No branch of step 210 is taken and step 220 is performed. Again, in step 220, software package deployment management program 104 (see FIG. 1) creates a failure report or notification indicating that the deployment of the software package is not authorized. Following step 220, the process of FIG. 2 ends at step 218.

Returning to step 212, if software package deployment management program 104 (see FIG. 1) determines that the QA seal indicates the software package is not approved for release and deployment to the target deployment environment whose details are obtained in step 206, then the No branch of step 212 is taken, step 220 is performed, as described above, and the process of FIG. 2 ends at step 218.

Figure 3:
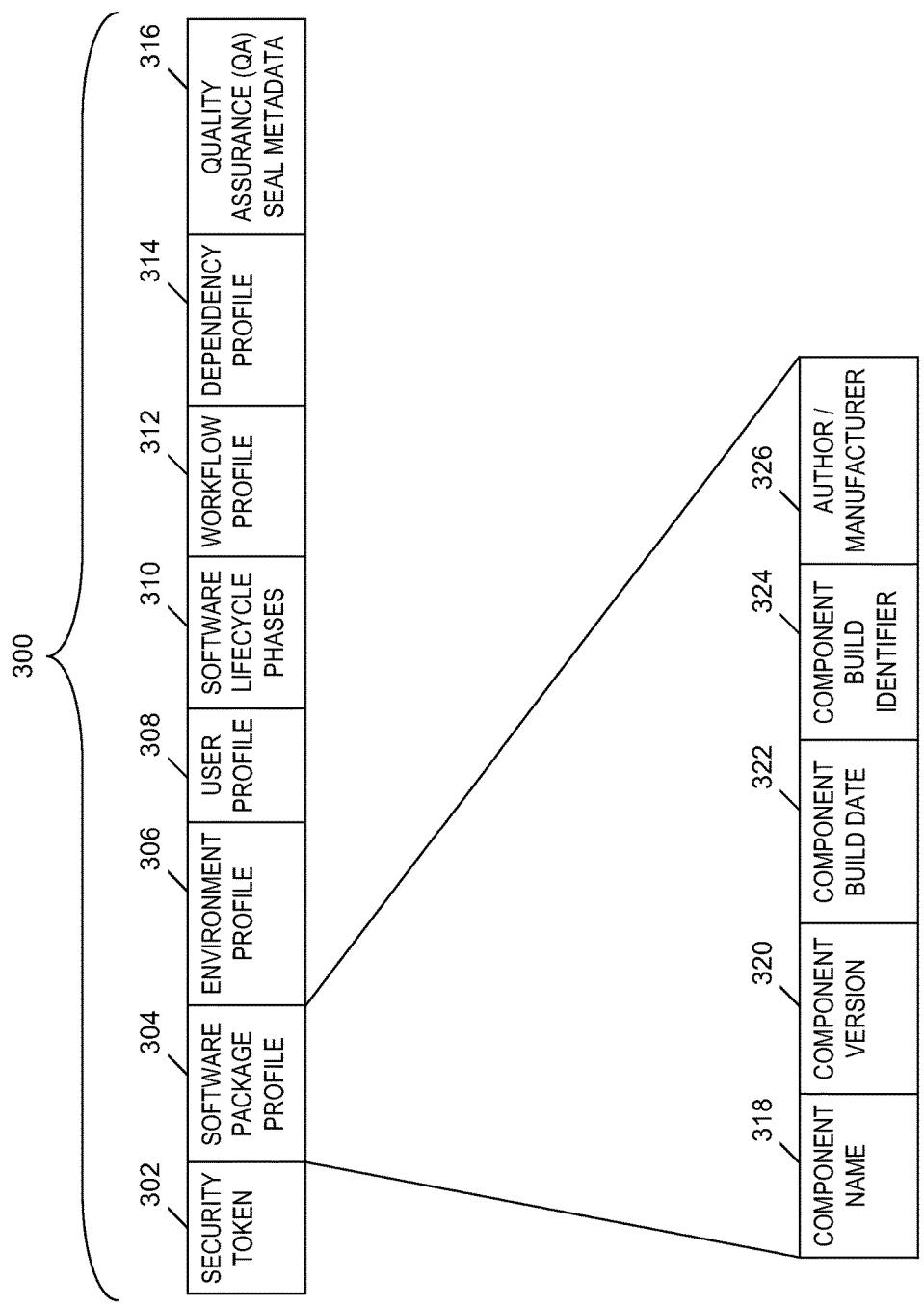
FIG. 3 depicts a QA seal used in the system of FIG. 1 and the process of FIG. 2, in accordance with embodiments of the present invention.

FIG. 3 depicts a QA seal 300 used in the system of FIG. 1 and the process of FIG. 2, in accordance with embodiments of the present invention. QA seal 300 is a data structure which includes a security token 302, a software package profile 304, an environment profile 306, a user profile 308, software lifecycle phase(s) 310, a workflow profile 312, a dependency profile 314, and metadata 316 associated with QA seal 300. As one alternate embodiment, QA seal 300 is a data structure that consists of security token 302, software package profile 304, environment profile 306, user profile 308 and QA seal metadata 316. In another embodiment, QA seal 300 is extended to include additional attributes for tracking, tracing and managing the QA seal-based software package deployment.

Security token 302 includes a hash signature, digital signature, or another type of encryption mechanism, which is checked to determine whether the software package that includes QA seal 300 has been tampered with or otherwise changed. For example, QA seal 300 is attached to a software package at time T1, where the software package is in a .zip file containing 11 files. After time T1 but before time T2, the software package is changed so that the .zip file now contains 10 files. A new security token is derived for the current contents of the .zip file of the software package and the security token 302 is compared to the new security token. Because the comparison reveals a difference between the security tokens, software package deployment management program 104 (see FIG. 1) determines that the software package containing QA seal 300 has been tampered with between time T1 and time T2.

Software package profile 304 includes a list of components of the software package containing QA seal 300 together with related metadata. In one embodiment, software package profile 304 includes a name and version of a component of the software package (i.e., a component name 318 and a component version 320), a build date 322 of the component, a build identifier 324 of the component, and an identifier of an author or manufacturer 326 of the component.

Environment profile 306 includes details about the hardware and software (including middleware and applications) required in the QA seal generation environment, build and test environments, and in the target deployment environment. Environment profile 306 specifies the environments in which the software package containing QA seal 300 is permitted to be deployed. For example, environment profile 306 indicates that a software package is permitted to be deployed to Environment 1 based on Operating System 1, but is not permitted to be deployed in any other environment such as Environment 2 based on Operating System 2.

User profile 308 includes an identifier of a user, a name of a user, and other data associated with the user. The user is a computer system that is automating the generation of QA seal 300 or a human user who is utilizing the software package deployment management program 104 (see FIG. 1) to manage a phase of the SDLC. For example, the user may be a build manager or a release administrator who is responsible for verifying the contents of the software package before the QA seal 300 is attached to the software package.

Software lifecycle phase(s) 310 specify the combination of the build, test and release phases for which QA seal 300 was generated.

Workflow profile 312 includes workflow steps, identifier(s) of reviewer(s), name(s) of the reviewer(s), a status of a quality approval of the software package containing QA seal 300 before the release of the software package, and other workflow-related metadata.

Dependency profile 314 includes details of hardware and software dependencies and pre-requisites, including pre-requisite middleware and applications, that are required for successful deployment of the software package containing QA seal 300.

QA seal metadata 316 includes metadata associated with QA seal 300 itself, such as a timestamp of the generation of QA seal 300, a history of modification(s) to QA seal 300, a status of an approval of QA seal 300, and a phase of QA seal 300, where the phase is included in a QA lifecycle.

Figure 4:
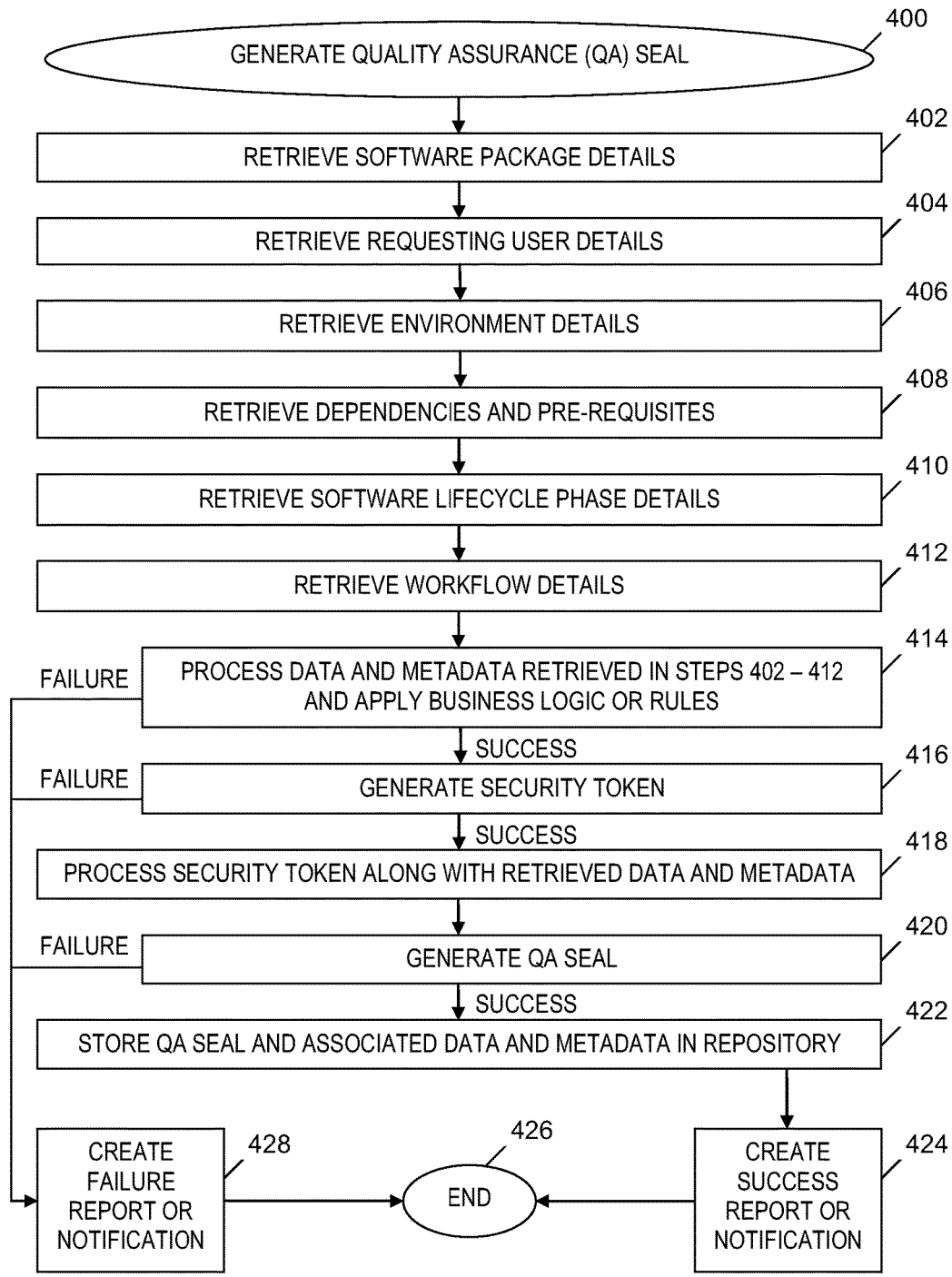
FIG. 4 is a flowchart of a process of generating a QA seal used in the system of FIG. 1 and the process of FIG. 2, in accordance with embodiments of the present invention.
Figure 5:
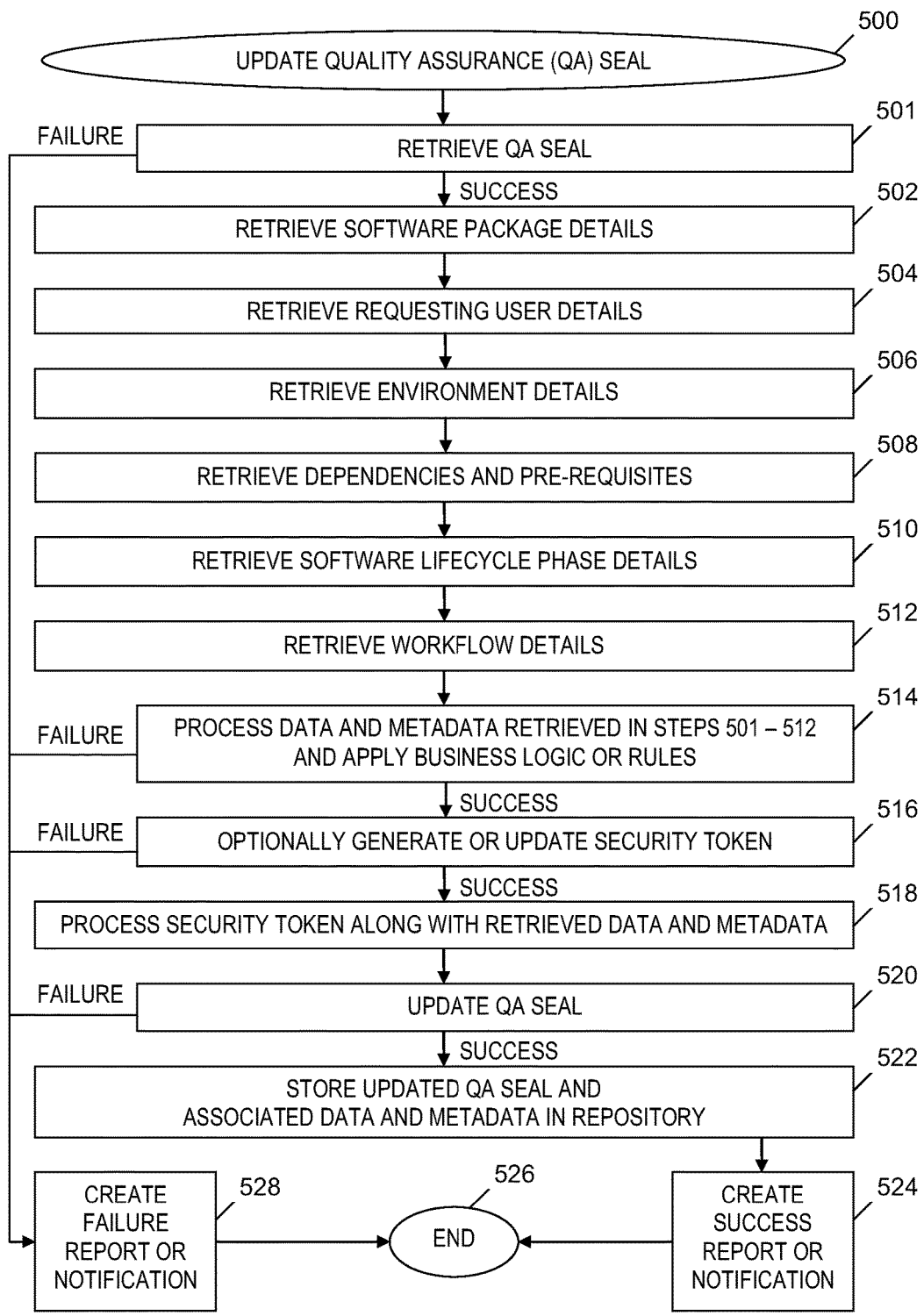
FIG. 5 is a flowchart of a process of updating a QA seal used in the system of FIG. 1 and the process of FIG. 2, in accordance with embodiments of the present invention.
Figure 7:
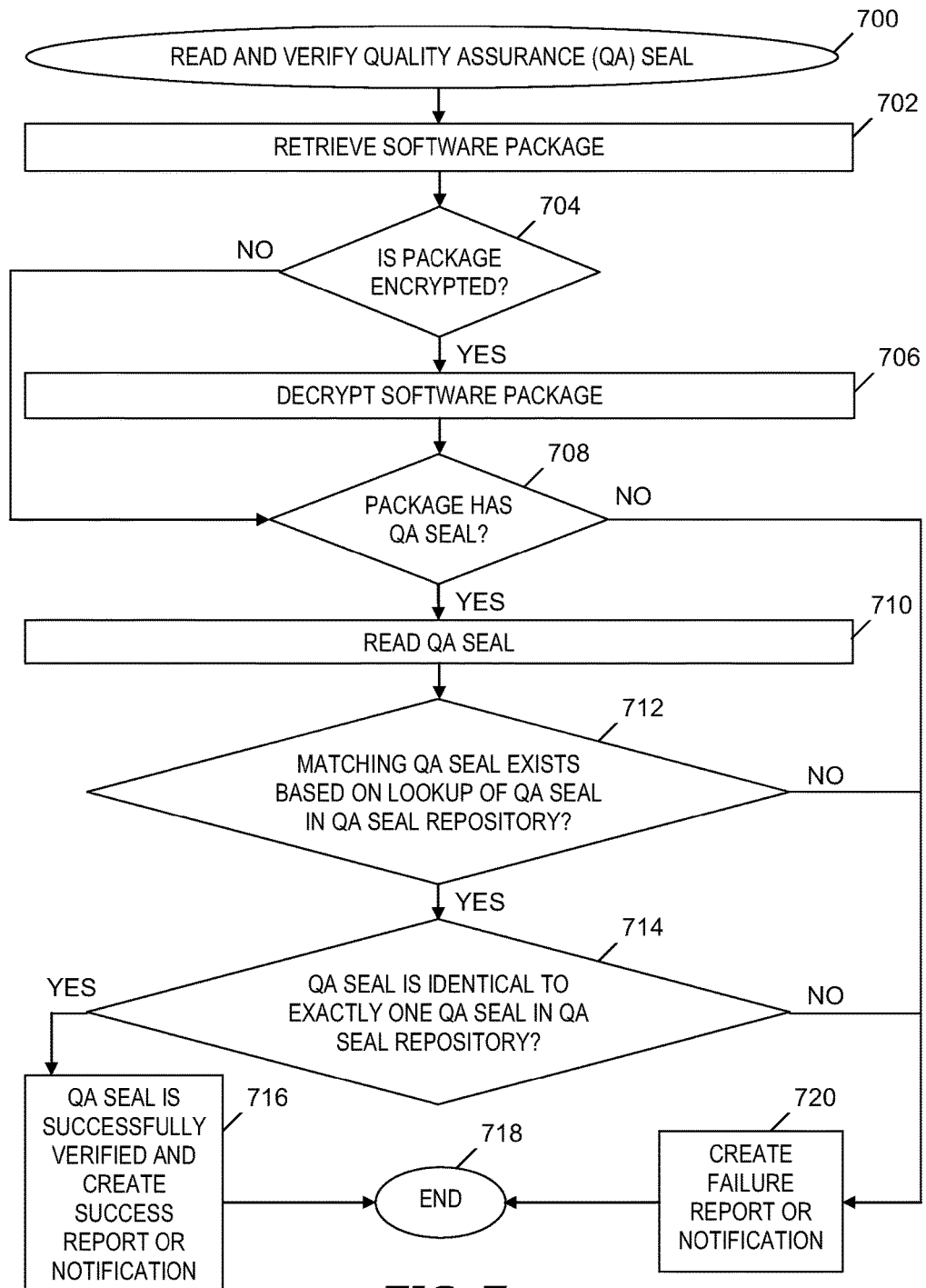
FIG. 7 is a flowchart of a process of reading and verifying a QA seal used in the system of FIG. 1 and the process of FIG. 2, in accordance with embodiments of the present invention.
Figure 8:
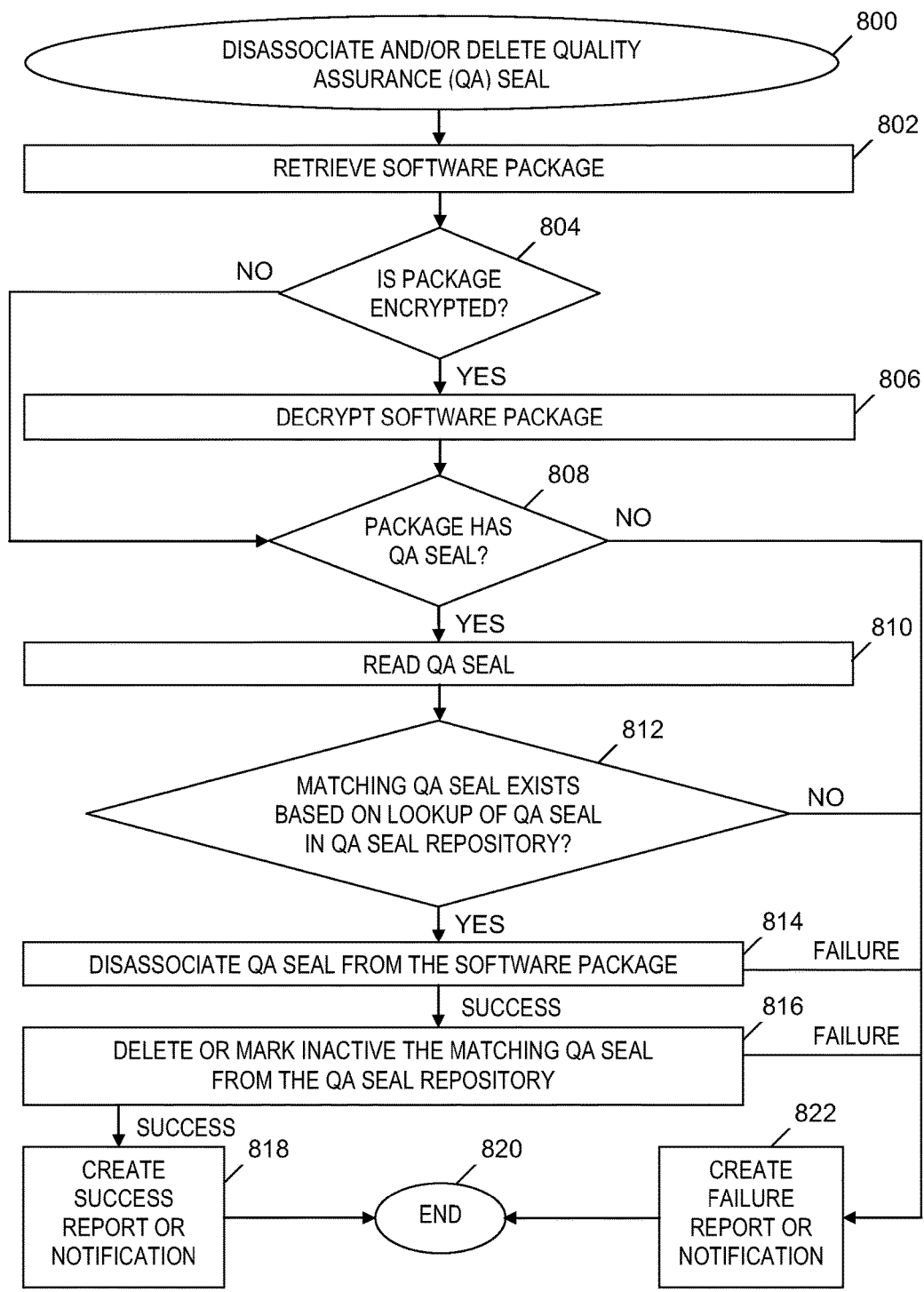
FIG. 8 is a flowchart of a process of disassociating and/or deleting a QA seal used in the system of FIG. 1 and the process of FIG. 2, in accordance with embodiments of the present invention.

The lifecycle for a QA seal such as QA seal 300 includes processes for (1) generating the QA seal (see FIG. 4), (2) updating the QA seal (see FIG. 5), (3) storing the QA seal in QA seal repository 108 (see FIG. 1), where the storing is described in step 422 in FIG. 4 and in step 522 in FIG. 5, (4) associating the QA seal with a software package (see FIG. 6), (5) reading the QA seal (see step 710 in FIG. 7), (6) verifying the QA seal (see steps 712 and 714 in FIG. 7), (7) disassociating the QA seal (see step 814 in FIG. 8), and (8) deleting the QA seal from QA seal repository 108 (see FIG. 1), where the deleting is described in step 816 in FIG. 8).

FIG. 4 is a flowchart of a process of generating a QA seal used in the system of FIG. 1 and the process of FIG. 2, in accordance with embodiments of the present invention. The process of FIG. 4 starts at step 400. In step 402, software package deployment management program 104 (see FIG. 1) retrieves from software package repository 106 (see FIG. 1)

details that identify and specify a software package. The details retrieved in step 402 include, but are not limited to, the contents or components and the version of the software package, and metadata for each component including component name, component version, component build date, component build identifier, and author or manufacturer of the component. Depending on the scope, the software package specified by the details retrieved in step 402 is a single computer file or a set of computer files.

In step 404, software package deployment management program 104 (see FIG. 1) retrieves details identifying and specifying the user who requests a generation of the QA seal. The details retrieved in step 404 include, but are not limited to, a user identifier, a user name, and a timestamp of the user request for the generation of the QA seal.

In step 406, software package deployment management program 104 (see FIG. 1) retrieves details identifying and specifying the QA seal generation environment, the build and test environments, and the target deployment environment to which the software package is permitted to be deployed. The details retrieved in step 406 include, but are not limited to, details about the hardware and software included in each of the aforementioned environments (including middleware and applications).

In step 408, software package deployment management program 104 (see FIG. 1) retrieves details about hardware and software dependencies and pre-requisites needed for a successful deployment of the software package containing the QA seal being generated. The details retrieved in step 408 include pre-requisite middleware and pre-requisite applications needed for the successful deployment of the software package.

In step 410, software package deployment management program 104 (see FIG. 1) retrieves details about software lifecycle phase(s). The details retrieved in step 410 include identification(s) of the build, test and/or release phases of the software development lifecycle, where the phase(s) are associated with the QA seal being generated.

In step 412, software package deployment management program 104 (see FIG. 1) retrieves details about the workflow that specifies the software development lifecycle for the software package. The details retrieved in step 412 include, but are not limited to, reviewer identifier, reviewer name, status of the approval of the software package, and the status of the software package at key decision checkpoints of the workflow.

In step 414, software package deployment management program 104 (see FIG. 1) processes data and metadata retrieved in steps 402, 404, 406, 408, 410 and 412, and applies business logic or business rules to at least some of the data and/or metadata retrieved in steps 402, 404, 406, 408, 410 and 412 to determine whether the processing in step 414 is a success or a failure. The processing in step 414 includes aligning: (1) the software package details retrieved in step 402 to the data required in software package profile 304 (see FIG. 3), (2) the user details retrieved in step 404 to the data required in user profile 308 (see FIG. 3), (3) the environment details retrieved in step 406 to the data required in environment profile 306 (see FIG. 3), (4) the dependencies and pre-requisites retrieved in step 408 to the data required in dependency profile 314 (see FIG. 3), (5) the software lifecycle phase details retrieved in step 410 to the data required in software lifecycle phases 310 (see FIG. 3), and (6) the workflow details retrieved in step 412 to the data required in workflow profile 312 (see FIG. 3).

In one embodiment, the application of business logic or business rules in step 414 includes checking that the details retrieved in steps 402, 404, 406, 408, 410, and 412 include details that are required to be in the QA seal and/or are required for a successful deployment of the software package. Prior to step 414, software package deployment management program 104 (see FIG. 1) determines which details are required by retrieving the details through the workflow or through other data structures and processes within the environment. For example, software package deployment management program 104 (see FIG. 1) determines that the software package must be an executable file, and in step 414 applies a business rule to validate that the software package is an executable file.

If the application of the business logic or business rules in step 414 determines that the processing in step 414 was a success (i.e., the required details were retrieved in steps 402, 404, 406, 408, 410 and 412, and were successfully aligned with the appropriate components of the QA seal being generated), then the Success branch of step 414 is taken and step 416 is performed.

In step 416, software package deployment management program 104 (see FIG. 1) generates a security token that includes a hash signature, digital signature, watermark, or encryption mechanism that specifies the software package. Alternatively, the security token is a physical security token such as a dongle. If software package deployment management program 104 (see FIG. 1) determines in step 416 that the security token was successfully generated in step 416, then the Success branch of step 416 is taken and step 418 is performed. A change over a period of time in the security token initially generated in step 416 indicates that the software package has changed or has been tampered with in the period of time.

In step 418, software package deployment management program 104 (see FIG. 1) processes the security token generated in step 416, along with the data and metadata retrieved in steps 402, 404, 406, 408, 410 and 412. The processing in step 418 includes aligning the security token generated in step 416 to the data required in security token 302 (see FIG. 3) included in the QA seal.

In step 420, software package deployment management program 104 (see FIG. 1) generates QA seal 300 (see FIG. 3) by storing: (1) the software package details retrieved in step 402 in software package profile 304 (see FIG. 3), (2) the user details retrieved in step 404 in user profile 308 (see FIG. 3), (3) the environment details retrieved in step 406 in environment profile 306 (see FIG. 3), (4) the dependencies and pre-requisites retrieved in step 408 in dependency profile 314 (see FIG. 3), (5) the software lifecycle phase details retrieved in step 410 in software lifecycle phases 310 (see FIG. 3), and (6) the workflow details retrieved in step 412 in workflow profile 312 (see FIG. 3).

If software package deployment management program 104 (see FIG. 1) determines in step 420 that QA seal 300 (see FIG. 3) is successfully generated, then the Success branch of step 420 is taken and step 422 is performed.

In step 422, software package deployment management program 104 (see FIG. 1) stores QA seal 300 (see FIG. 3) and data and metadata associated with the QA seal in QA seal repository 108 (see FIG. 1).

In step 424, software package deployment management program 104 (see FIG. 1) creates a success report or notification that indicates QA seal 300 (see FIG. 3) was successfully generated. Following step 424, the process of FIG. 4 ends at step 426.

Returning to step 414, if software package deployment management program 104 (see FIG. 1) determines that the application of the business logic or business rules indicates that the details retrieved in steps 402, 404, 406, 408, 410, and 412 failed to be processed correctly in step 414 (i.e., the required details were not retrieved in step 402, 404, 406, 408, 410 and/or 412, or were not successfully aligned with the appropriate components of the QA seal being generated), then the Failure branch of step 414 is taken and step 428 is performed.

In step 428, software package deployment management program 104 (see FIG. 1) creates a failure report or notification that indicates QA seal 300 (see FIG. 3) was not successfully generated. Following step 428, the process of FIG. 4 ends at step 426.

Returning to step 416, if software package deployment management program 104 (see FIG. 1) determines the security token was not successfully generated in step 416, then the Failure branch of step 416 is taken, step 428 is performed, as described above, and the process of FIG. 4 ends at step 426.

Returning to step 420, if software package deployment management program 104 (see FIG. 1) determines QA seal 300 (see FIG. 3) is not successfully generated, then the Failure branch of step 420 is taken, step 428 is performed, as described above, and the process of FIG. 4 ends at step 426.

FIG. 5 is a flowchart of a process of updating a QA seal used in the system of FIG. 1 and the process of FIG. 2, in accordance with embodiments of the present invention. The process of FIG. 5 starts at step 500. The process of FIG. 5 is applicable to a QA seal that is already associated to a software package. In step 501, software package deployment management program 104 (see FIG. 1) retrieves from QA seal repository 108 (see FIG. 1) the QA seal (e.g., QA seal 300 in FIG. 3) to be updated.

In step 502, software package deployment management program 104 (see FIG. 1) retrieves from software package repository 106 (see FIG. 1) details that identify and specify a software package. The details retrieved in step 502 include, but are not limited to, the contents or components and the version of the software package, and metadata for each component including component name, component version, component build date, and author or manufacturer of the component.

In step 504, software package deployment management program 104 (see FIG. 1) retrieves details identifying and specifying the user who requests an update of the QA seal. The details retrieved in step 504 include, but are not limited to, a user identifier, a user name, and a timestamp of the user request for the update of the QA seal.

In step 506, software package deployment management program 104 (see FIG. 1) retrieves details identifying and specifying the build environment, test environment, and/or the target deployment environment to which the software package is permitted to be deployed. The details retrieved in step 506 include, but are not limited to, details about the hardware and software (including middleware and applications) included in each of the aforementioned environments.

In step 508, software package deployment management program 104 (see FIG. 1) retrieves details about hardware and software dependencies and pre-requisites needed for a successful deployment of the software package containing the QA seal being updated. The details retrieved in step 508 include pre-requisite middleware and pre-requisite applications needed for the successful deployment of the software package.

In step 510, software package deployment management program 104 (see FIG. 1) retrieves details about software lifecycle phase(s). The details retrieved in step 510 include identification(s) of the build, test and/or release phases of the software development lifecycle, where the phase(s) are associated with the QA seal being updated.

In step 512, software package deployment management program 104 (see FIG. 1) retrieves details about the workflow that specifies the software development lifecycle for the software package. The details retrieved in step 512 include, but are not limited to, reviewer identifier, reviewer name, status of the approval of the software package, and the status of the software package at key decision checkpoints in the workflow.

In step 514, software package deployment management program 104 (see FIG. 1) processes data and metadata retrieved in steps 502, 504, 506, 508, 510 and 512, and applies business logic or business rules to at least some of the data and/or metadata retrieved in steps 502, 504, 506, 508, 510 and 512 to determine whether the processing in step 514 is a success or a failure. The processing in step 514 includes aligning: (1) the software package details retrieved in step 502 to the data required in software package profile 304 (see FIG. 3), (2) the user details retrieved in step 504 to the data required in user profile 308 (see FIG. 3), (3) the environment details retrieved in step 506 to the data required in environment profile 306 (see FIG. 3), (4) the dependencies and pre-requisites retrieved in step 508 to the data required in dependency profile 314 (see FIG. 3), (5) the software lifecycle phase details retrieved in step 510 to the data required in software lifecycle phases 310 (see FIG. 3), and (6) the workflow details retrieved in step 512 to the data required in workflow profile 312 (see FIG. 3).

In one embodiment, the application of business logic or business rules in step 514 includes checking that the details retrieved in steps 502, 504, 506, 508, 510, and 512 include details that are required to be in the QA seal being updated and/or are required for a successful deployment of the software package associated with the QA seal. Prior to step 514, software package deployment management program 104 (see FIG. 1) determines which details are required by retrieving the details through the workflow or through other data structures and processes within the environment. For example, software package deployment management program 104 (see FIG. 1) determines that the software package must be an executable file, and in step 514 applies a business rule to validate that the software package is an executable file.

If the application of the business logic or business rules in step 514 determines that the processing in step 514 was a success (i.e., the required details were retrieved in steps 502, 504, 506, 508, 510 and 512, and were successfully aligned with the appropriate components of the QA seal being updated), then the Success branch of step 514 is taken and step 516 is performed.

In step 516, software package deployment management program 104 (see FIG. 1) generates or updates a security token that includes a hash signature, digital signature, watermark, or encryption mechanism. Alternatively, the security token is a physical security token such as a dongle. If software package deployment management program 104 (see FIG. 1) determines in step 516 that the security token was successfully generated or updated in step 516, then the Success branch of step 516 is taken and step 518 is performed.

Alternatively, step 516 may be omitted so that the Success branch of step 514 is followed by step 520.

In step 518, software package deployment management program 104 (see FIG. 1) processes the security token generated or updated in step 516, along with the data and metadata retrieved in steps 502, 504, 506, 508, 510 and 512. The processing in step 518 includes aligning the security token generated or updated in step 516 to the data required in security token 302 (see FIG. 3) included in the QA seal.

In step 520, software package deployment management program 104 (see FIG. 1) updates the QA seal by storing: (1) the software package details retrieved in step 502 in software package profile 304 (see FIG. 3), (2) the user details retrieved in step 504 in user profile 308 (see FIG. 3), (3) the environment details retrieved in step 506 in environment profile 306 (see FIG. 3), (4) the dependencies and prerequisites retrieved in step 508 in dependency profile 314 (see FIG. 3), (5) the software lifecycle phase details retrieved in step 510 in software lifecycle phases 310 (see FIG. 3), and (6) the workflow details retrieved in step 512 in workflow profile 312 (see FIG. 3).

If software package deployment management program 104 (see FIG. 1) determines in step 520 that the QA seal is successfully updated, then the Success branch of step 520 is taken and step 522 is performed.

In step 522, software package deployment management program 104 (see FIG. 1) stores the updated QA seal and data and metadata associated with the updated QA seal in QA seal repository 108 (see FIG. 1).

In step 524, software package deployment management program 104 (see FIG. 1) creates a success report or notification that indicates the QA seal was successfully updated. Following step 524, the process of FIG. 5 ends at step 526.

Returning to step 514, if software package deployment management program 104 (see FIG. 1) determines that the application of the business logic or business rules indicates that the details retrieved in steps 502, 504, 506, 508, 510, and 512 failed to be processed correctly in step 514 (i.e., the required details were not retrieved in step 502, 504, 506, 508, 510 and/or 512, or were not successfully aligned with the appropriate components of the QA seal being generated), then the Failure branch of step 514 is taken and step 528 is performed.

In step 528, software package deployment management program 104 (see FIG. 1) creates a failure report or notification that indicates QA seal 300 (see FIG. 3) was not successfully generated. Following step 528, the process of FIG. 5 ends at step 526.

Returning to step 516, if software package deployment management program 104 (see FIG. 1) determines the security token was not successfully generated or updated in step 516, then the Failure branch of step 516 is taken, step 528 is performed, as described above, and the process of FIG. 5 ends at step 526.

Returning to step 520, if software package deployment management program 104 (see FIG. 1) determines the QA seal is not successfully updated, then the Failure branch of step 520 is taken, step 528 is performed, as described above, and the process of FIG. 5 ends at step 526.

Figure 6:
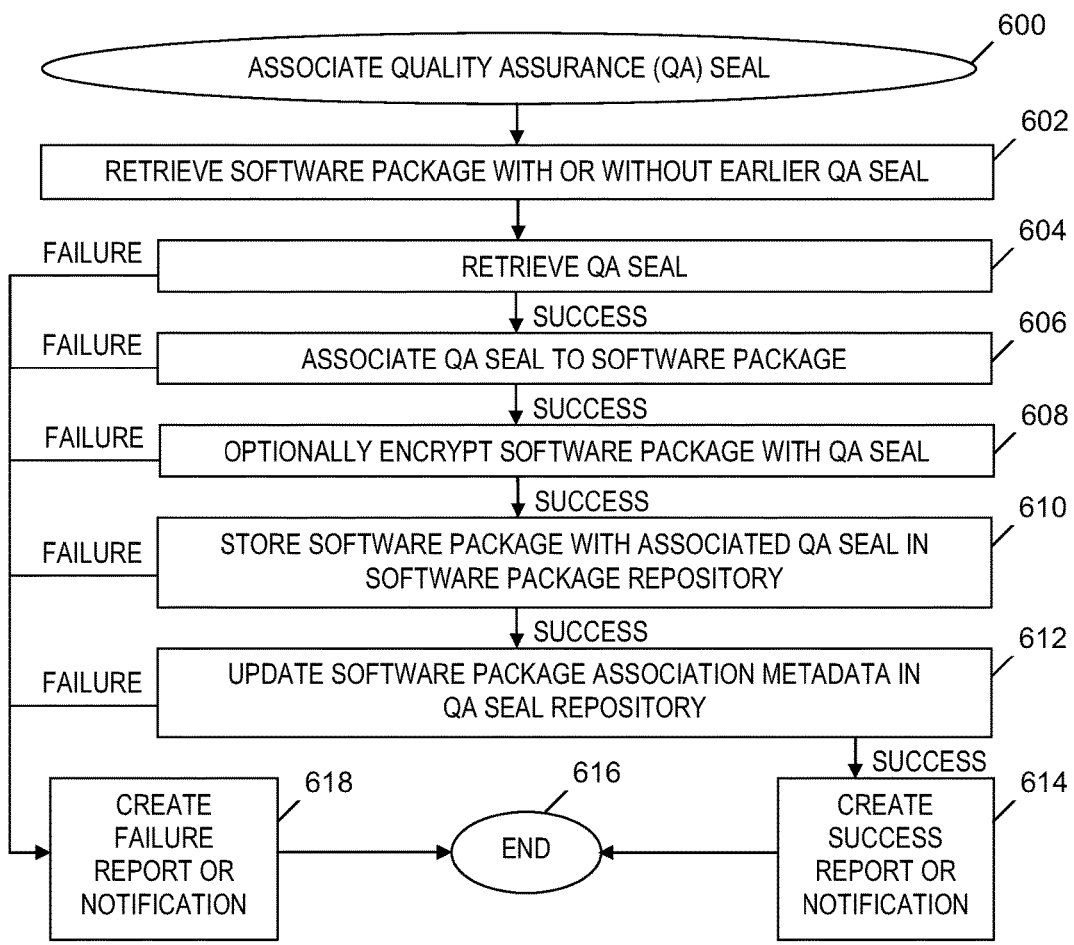
FIG. 6 is a flowchart of a process of associating a QA seal to a software package, where the QA seal is used in the system of FIG. 1 and the process of FIG. 2, in accordance with embodiments of the present invention.

FIG. 6 is a flowchart of a process of associating a new or updated QA seal to a software package, where the QA seal is used in the system of FIG. 1 and the process of FIG. 2, in accordance with embodiments of the present invention. The process of FIG. 6 starts at step 600. In step 602, software package deployment management program 104 (see FIG. 1) retrieves a software package from software package repository 106 (see FIG. 1). The retrieved software package can already have a QA seal associated therewith, or have no previous associated QA seal.

In step 604, software package deployment management program 104 (see FIG. 1) retrieves QA seal 300 (see FIG. 3) from QA seal repository 108 (see FIG. 1). If software package deployment management program 104 (see FIG. 1) determines in step 602 that QA seal 300 (see FIG. 3) was successfully retrieved, then the Success branch of step 604 is taken and step 604 is performed.

In step 606, software package deployment management program 104 (see FIG. 1) associates the QA seal 300 (see FIG. 3) retrieved in step 604 to the software package retrieved in step 602. If software package deployment management program 104 (see FIG. 1) determines in step 606 that QA seal 300 (see FIG. 3) was successfully associated to the software package, then the Success branch of step 606 is taken and step 608 is performed.

In step 608, software package deployment management program 104 (see FIG. 1) encrypts the software package retrieved in step 602 with the QA seal 300 (see FIG. 3) associated to the software package in step 606. If software package deployment management program 104 (see FIG. 1) determines in step 608 that the software package was successfully encrypted with QA seal 300 (see FIG. 3), then the Success branch of step 608 is taken and step 610 is performed. Alternatively, step 608 is omitted and step 606 is followed by step 610.

In step 610, software package deployment management program 104 (see FIG. 1) stores the software package retrieved in step 602 and the QA seal 300 (see FIG. 3) associated with the software package in step 606 in the software package repository 106 (see FIG. 1). If software package deployment management program 104 (see FIG. 1) determines in step 610 that the software package and associated QA seal 300 (see FIG. 3) were successfully stored in software package repository 106 (see FIG. 1), then the Success branch of step 610 is taken and step 612 is performed.

In step 612, software package deployment management program 104 (see FIG. 1) updates software package profile 304 (see FIG. 3) in QA seal 300 (see FIG. 3) stored in QA seal repository 108 (see FIG. 1) to indicate that QA seal 300 (see FIG. 3) is associated with the software package retrieved in step 602. If software package deployment management program 104 (see FIG. 1) determines in step 612 that software package profile 304 (see FIG. 3) is successfully updated as described above, then the Success branch of step 612 is taken and step 614 is performed.

In step 614, software package deployment management program 104 (see FIG. 1) creates a success report or notification to indicate QA seal 300 (see FIG. 3) was successfully associated with the software package retrieved in step 602. Following step 614, the process of FIG. 6 ends at step 616.

Returning to step 604, if software package deployment management program 104 (see FIG. 1) determines that QA seal 300 (see FIG. 3) was not successfully retrieved, then the Failure branch of step 604 is taken and step 618 is performed.

In step 618, software package deployment management program 104 (see FIG. 1) creates a failure report or notification that indicates QA seal 300 (see FIG. 3) was not successfully associated with the software package retrieved in step 602.

Returning to step 606, if software package deployment management program 104 (see FIG. 1) determines that QA seal 300 (see FIG. 3) was not successfully associated to the software package, then the Failure branch of step 606 is taken, step 618 is performed, as described above, and the process of FIG. 6 ends at step 616.

Returning to step 608, if software package deployment management program 104 (see FIG. 1) determines that the software package was not successfully encrypted with QA seal 300 (see FIG. 3), then the Failure branch of step 608 is taken, step 618 is performed, as described above, and the process of FIG. 6 ends at step 616.

Returning to step 610, if software package deployment management program 104 (see FIG. 1) determines that the software package and associated QA seal 300 (see FIG. 3) were not successfully stored in software package repository 106 (see FIG. 1), then the Failure branch of step 610 is taken, step 618 is performed, as described above, and the process of FIG. 6 ends at step 616.

Returning to step 612, if software package deployment management program 104 (see FIG. 1) determines that software package profile 304 (see FIG. 3) was not successfully updated to indicate that QA seal 300 (see FIG. 3) is associated with the software package retrieved in step 602, then the Failure branch of step 612 is taken, step 618 is performed, as described above, and the process of FIG. 6 ends at step 616.

FIG. 7 is a flowchart of a process of reading and verifying a QA seal used in the system of FIG. 1 and the process of FIG. 2, in accordance with embodiments of the present invention. The process of FIG. 7 starts at step 700. In step 702, software package deployment management program 104 (see FIG. 1) retrieves a software package from software package repository 106 (see FIG. 1).

In step 704, software package deployment management program 104 (see FIG. 1) determines whether the software package retrieved in step 702 is encrypted (i.e., encrypted in step 608 in FIG. 6). If software package deployment management program 104 (see FIG. 1) determines in step 704 that the software package is encrypted, then the Yes branch of step 704 is taken and step 706 is performed.

In step 706, software package deployment management program 104 (see FIG. 1) decrypts the software package retrieved in step 702.

In step 708, software package deployment management program 104 (see FIG. 1) determines whether the software package retrieved in step 702 has a QA seal (e.g., QA seal 300 in FIG. 3) associated with the software package (i.e., whether a QA seal is embedded in the software package). Software package deployment management program 104 (see FIG. 1) determines whether the software package has a QA seal by determining whether there is a QA seal stored within the software package in the software package repository 106 (see FIG. 1). If software package deployment management program 104 (see FIG. 1) determines that the software package has an associated QA seal, then the Yes branch of step 708 is taken and step 710 is performed.

In step 710, software package deployment management program 104 (see FIG. 1) reads the QA seal associated with the software package retrieved in step 702.

In step 712, software package deployment management program 104 (see FIG. 1) performs a lookup of the QA seal in QA seal repository 108 (see FIG. 1) to determine whether a QA seal exists that matches the QA seal that was read in step 710. If software package deployment management program 104 (see FIG. 1) determines in step 712 that a QA seal in QA seal repository 108 (see FIG. 1) matches the QA seal that was read in step 710, then the Yes branch of step 712 is taken and step 714 is performed.

In step 714, software package deployment management program 104 (see FIG. 1) determines whether the QA seal associated with the software package retrieved in step 702 is identical to exactly one QA seal in the QA seal repository 108 (see FIG. 1). If software package deployment management program 104 (see FIG. 1) determines in step 714, that the QA seal associated with the software package is identical to exactly one QA seal in the QA seal repository 108 (see FIG. 1), then the Yes branch is taken and step 716 is performed.

In step 716, software package deployment management program 104 (see FIG. 1) creates a success report or notification that indicates the QA seal read in step 710 is successfully verified. Following step 716, the process of FIG. 7 ends at step 718.

Returning to step 704, if software package deployment management program 104 (see FIG. 1) determines that the software package is not encrypted, then the No branch of step 704 is taken, and the process continues with step 708, as described above.

Returning to step 708, if software package deployment management program 104 (see FIG. 1) determines the software package does not have an associated QA seal (i.e., there is no QA seal embedded in the software package), then the No branch of step 708 is taken and step 720 is performed.

In step 720, software package deployment management program 104 (see FIG. 1) creates a failure report or notification that indicates no QA seal is associated with the software package retrieved in step 702 or a QA seal associated with the software package retrieved in step 702 cannot be successfully verified. Following step 720, the process of FIG. 7 ends at step 718.

Returning to step 712, if software package deployment management program 104 (see FIG. 1) determines that no matching QA seal exists in the QA seal repository 108 (see FIG. 1) based on a lookup in the QA seal repository 108 (see FIG. 1) of the QA seal read in step 710, then the No branch of step 712 is taken, step 720 is performed, as described above, and the process ends at step 718.

Returning to step 714, if software package deployment management program 104 (see FIG. 1) determines that the QA seal read in step 710 is not identical to exactly one QA seal in the QA seal repository 108 (see FIG. 1), then the No branch of step 714 is taken, step 720 is performed, as described above, and the process of FIG. 7 ends at step 718.

FIG. 8 is a flowchart of a process of disassociating and/or deleting a QA seal used in the system of FIG. 1 and the process of FIG. 2, in accordance with embodiments of the present invention. The process of FIG. 8 starts at step 800. In step 802, software package deployment management program 104 (see FIG. 1) retrieves a software package from software package repository 106 (see FIG. 1).

In step 804, software package deployment management program 104 (see FIG. 1) determines whether the software package retrieved in step 802 is encrypted (i.e., encrypted in step 608 in FIG. 6). If software package deployment management program 104 (see FIG. 1) determines in step 804 that the software package is encrypted, then the Yes branch of step 804 is taken and step 806 is performed.

In step 806, software package deployment management program 104 (see FIG. 1) decrypts the software package retrieved in step 802.

In step 808, software package deployment management program 104 (see FIG. 1) determines whether the software package retrieved in step 802 has a QA seal (e.g., QA seal 300 in FIG. 3) associated with the software package (i.e., whether a QA seal is embedded in the software package). Software package deployment management program 104 (see FIG. 1) determines whether the software package has a QA seal by determining whether there is a QA seal stored within the software package in the software package repository 106 (see FIG. 1). If software package deployment management program 104 (see FIG. 1) determines that the software package has an associated QA seal, then the Yes branch of step 808 is taken and step 810 is performed.

In step 810, software package deployment management program 104 (see FIG. 1) reads the QA seal associated with the software package retrieved in step 802.

In step 812, software package deployment management program 104 (see FIG. 1) performs a lookup of the QA seal in QA seal repository 108 (see FIG. 1) to determine whether a QA seal exists that matches the QA seal that was read in step 810. If software package deployment management program 104 (see FIG. 1) determines in step 812 that a QA seal in QA seal repository 108 (see FIG. 1) matches the QA seal that was read in step 810, then the Yes branch of step 812 is taken and step 814 is performed.

In step 814, software package deployment management program 104 (see FIG. 1) disassociates the QA seal from the software package retrieved in step 802. If software package deployment management program 104 (see FIG. 1) determines that the QA seal is successfully disassociated in step 814, then the Success branch of step 814 is taken and step 816 is performed.

In step 816, software package deployment management program 104 (see FIG. 1) deletes the QA seal from QA seal repository 108 (see FIG. 1) or marks as inactive the QA seal in QA seal repository 108 (see FIG. 1). If software package deployment management program 104 (see FIG. 1) determines that the QA seal is successfully deleted or marked inactive in step 816, then the Success branch of step 816 is taken and step 818 is performed.

In step 818, software package deployment management program 104 (see FIG. 1) creates a success report or notification that indicates the QA seal read in step 810 is successfully disassociated from the software package and successfully deleted from or marked inactive in QA seal repository 108 (see FIG. 1). Following step 818, the process of FIG. 8 ends at step 820.

Returning to step 804, if software package deployment management program 104 (see FIG. 1) determines that the software package is not encrypted, then the No branch of step 804 is taken, and the process continues with step 808, as described above.

Returning to step 808, if software package deployment management program 104 (see FIG. 1) determines the software package does not have an associated QA seal (i.e., there is no QA seal embedded in the software package), then the No branch of step 808 is taken and step 822 is performed.

In step 822, software package deployment management program 104 (see FIG. 1) creates a failure report or notification that indicates no QA seal is associated with the software package retrieved in step 802, a QA seal associated with the software package retrieved in step 802 is not successfully disassociated from the software package, or a QA seal associated with the software package is not successfully deleted or marked inactive in the QA seal repository 108 (see FIG. 1). Following step 822, the process of FIG. 8 ends at step 820.

Returning to step 812, if software package deployment management program 104 (see FIG. 1) determines that no matching QA seal exists in the QA seal repository 108 (see FIG. 1) based on the lookup in the QA seal repository 108 (see FIG. 1) of the QA seal read in step 810, then the No branch of step 812 is taken, step 822 is performed, as described above, and the process ends at step 820.

Returning to step 814, if software package deployment management program 104 (see FIG. 1) determines that the QA seal read in step 810 is not successfully disassociated from the software package retrieved in step 802, then the Failure branch of step 814 is taken, step 822 is performed, as described above, and the process of FIG. 8 ends at step 820.

Returning to step 816, if software package deployment management program 104 (see FIG. 1) determines that the matching QA seal determined in step 812 is not successfully deleted from or marked inactive in the QA seal repository 108 (see FIG. 1), then the Failure branch of step 816 is taken, step 822 is performed, as described above, and the process of FIG. 8 ends at step 820.

Figure 9:
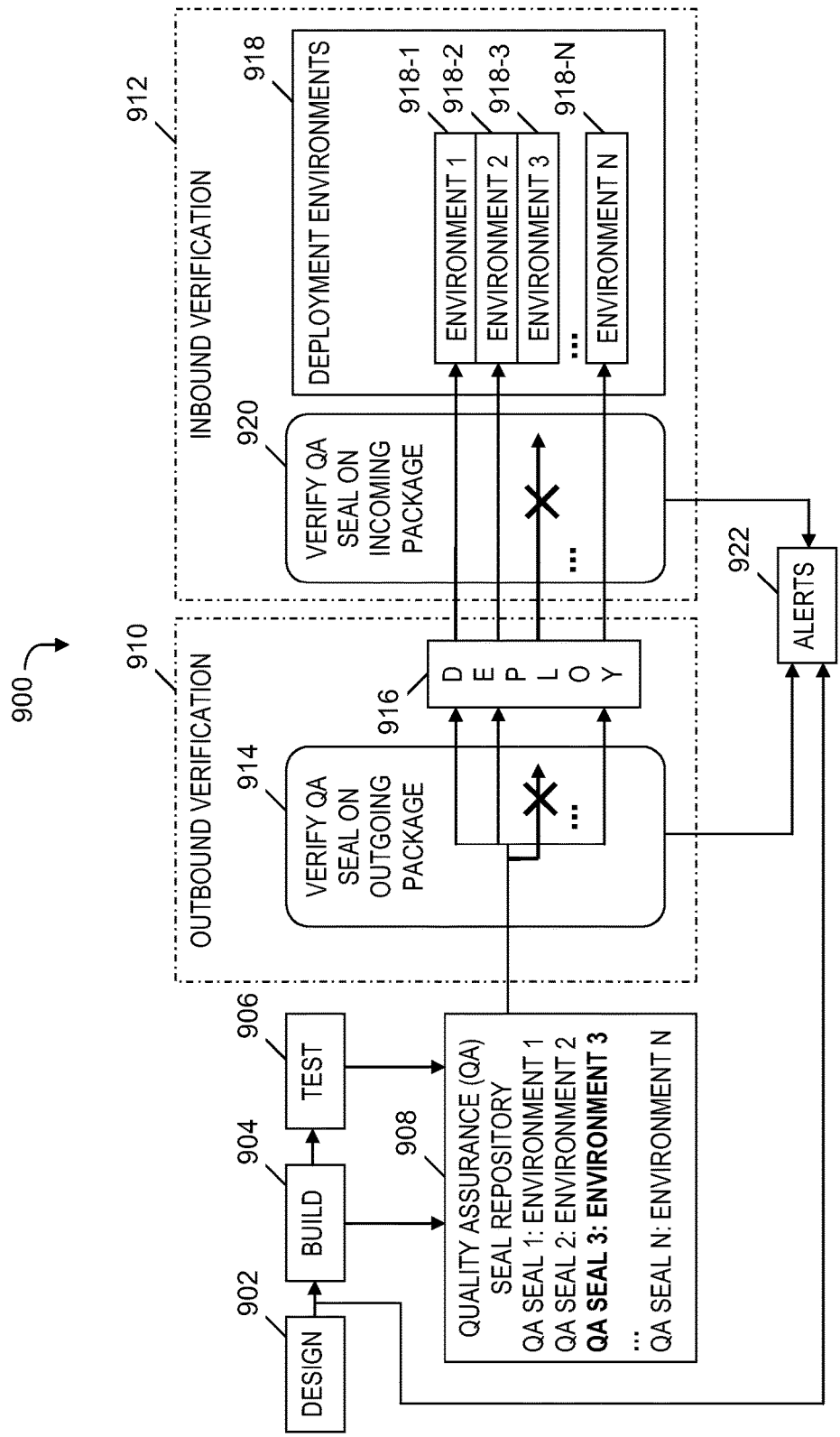
FIG. 9 depicts an example of using QA seals in outbound and inbound verification of QA seals in the management of software package deployment in the system of FIG. 1, in accordance with embodiments of the present invention.

FIG. 9 depicts an example of using QA seals in outbound and inbound verification of QA seals in the management of software package deployment in the system of FIG. 1, in accordance with embodiments of the present invention. Example 900 includes a design phase 902, a build phase 904, and a test phase 906. In build phase 904, QA seal repository 908 includes QA Seal 1 that specifies Environment 1, QA Seal 2 that specifies Environment 2, QA Seal 3 that specifies Environment 3 . . . and QA Seal N that specifies Environment N. QA seal repository 908 is an example of QA seal repository 108 (see FIG. 1).

Example 900 depicts an automated outbound verification 910 of QA seals embedded in an outgoing software package and an automated inbound verification 912 of QA seals embedded in an incoming software package. The automated outbound verification 910 and automated inbound verification 912 are not possible with existing deployment technologies.

In outbound verification 910, a software package is planned to be deployed to N environments (i.e., Environment 1, Environment 2, Environment 3, . . . , Environment N), where N is an integer greater than three. Prior to deployment of the software package in a deploy phase 916, software package deployment management program 104 (see FIG. 1) verifies the QA seals on the outgoing package 914. Through the verifying of the QA seals 914, software package deployment management program 104 (see FIG. 1) determines (i.e., in step 210 (see FIG. 2)) that QA Seal 1 indicates the software package is compatible with and is permitted to be deployed to Environment 1, QA Seal 2 indicates the software package is compatible with and is permitted to be deployed to Environment 2, but QA Seal 3 indicates the software package is not compatible with and is not permitted to be deployed to Environment 3, which is indicated by the "X" through the arrow in outbound verification 910.

In inbound verification 912, which is an alternative to outbound verification 910, automated verification of QA seals is performed in N deployment environments 918 (i.e., environment 918-1, environment 918-2, environment 918-3, . . . , environment 918-N). Inbound verification 912 includes verifying 920 QA seals on an incoming software package to determine whether each QA seal is valid and compatible with the deployment environment. In response to verifying 920 determining the QA Seal 1 is valid and indicates the software package is compatible with Environment 918-1, the deployment environment (i.e., Environment 918-1) accepts the incoming software package. In response to verifying 920 determining the QA Seal 2 is valid and indicates the software package is compatible with Environment 918-2, the deployment environment (i.e., Environment 918-2) accepts the incoming software package. In response to verifying 920 determining the QA Seal 3 is not valid or indicates the software package is not compatible with Environment 918-3, the deployment environment (i.e., Environment 918-3) rejects the incoming software package. The rejection of the incoming software package is depicted by the "X" through the arrow in inbound verification 912.

Alerts 922 may be generated after design phase 902, as a result of outbound verification 910, or as a result of inbound verification 912.

Figure 10:
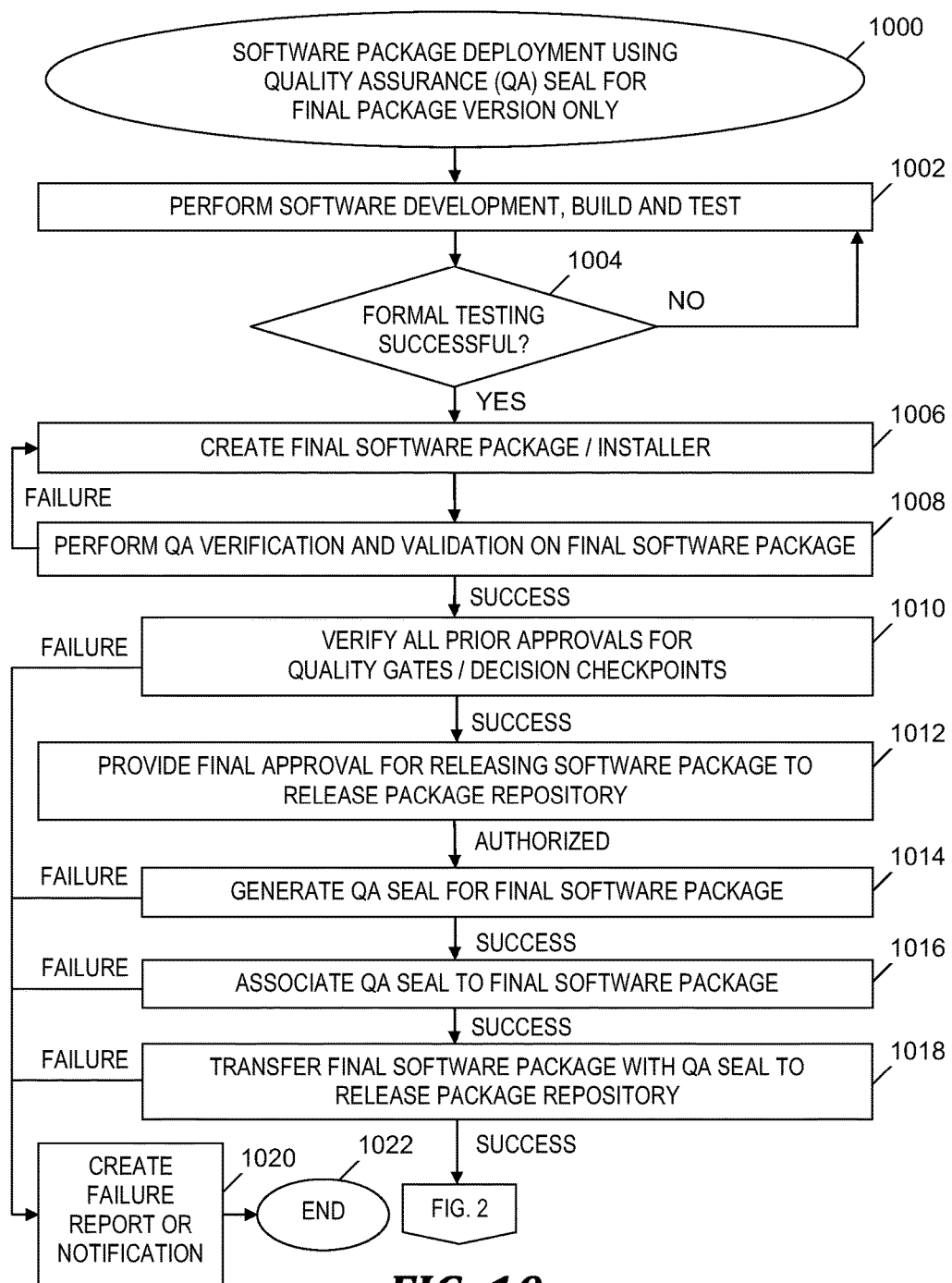
FIG. 10 is a flowchart of a process of managing software package deployment using a QA seal for a final package version only, in accordance with embodiments of the present invention.

FIG. 10 is a flowchart of a process of managing software package deployment using a QA seal for a final package version only, in accordance with embodiments of the present invention. The process of FIG. 10 starts at step 1000. In step 1002, computer 102 (see FIG. 1) performs the software development, build and test phases. In the development phase, a development team transfers source code check-in and baseline to the version control repository 110 (see FIG. 1). In the build phase, build scripts are executed and subsequently moved to the build repository 112 (see FIG. 1).

In step 1004, computer 102 (see FIG. 1) determines whether formal testing of a test package retrieved from the test package repository 114 (see FIG. 1) was successful. If computer 102 determines in step 1004 that formal testing was successful, then the Yes branch of step 1004 is taken and step 1006 is performed.

In step 1006, computer 102 (see FIG. 1) creates a final software package.

In step 1008, a manual process performs QA verification and validation on the final software package created in step 1006, without utilizing any software tokens or QA seals. If the manual process determines the final software package is successfully verified and validated, then the Success branch of step 1008 is taken and step 1010 is performed.

In step 1010, a manual process verifies all prior approvals for quality gates and decision checkpoints by checking records in tools, emails, logs, etc. If the manual process determines that all the aforementioned prior approvals are successfully verified, then the Success branch of step 1010 is taken and step 1012 is performed.

In step 1012, a manual process provides final approval via email or physical signature for releasing the software package to the release package repository 116 (see FIG. 1).

In step 1014, software package deployment management program 104 (see FIG. 1) generates a QA seal for the final software package using the process of FIG. 4. If software package deployment management program 104 (see FIG. 1) determines the QA seal is successfully generated in step 1014, then the Success branch of step 1014 is taken and step 1016 is performed.

In step 1016, software package deployment management program 104 (see FIG. 1) associates the QA seal to the final software package using the process of FIG. 6. If software package deployment management program 104 (see FIG. 1) determines the QA seal is successfully associated to the final software package in step 1016, then the Success branch of step 1016 is taken and step 1018 is performed.

In step 1018, software package deployment management program 104 (see FIG. 1) transfers the final software package with the associated QA seal to the release package repository 116 (see FIG. 1). If software package deployment management program 104 (see FIG. 1) determines that the transfer in step 1018 is successful, then the Success branch of step 1018 is taken, and the management of the deployment of the software package continues with the process of FIG. 2.

Returning to step 1008, if the manual process determines the final software package is not successfully verified or validated, then the Failure branch of step 1008 is taken and the process loops back to step 1006.

Returning to step 1010, if the manual process determines that not all the aforementioned prior approvals are successfully verified, then the Failure branch of step 1010 is taken and step 1020 is performed. In step 1020 following step 1010, software package deployment management program 104 (see FIG. 1) creates a failure report or notification to indicate that not all the prior approvals were successfully verified.

Returning to step 1014, if software package deployment management program 104 (see FIG. 1) determines the QA seal is not successfully generated, then the Failure branch of step 1014 is taken and step 1020 is performed. In step 1020 following step 1014, software package deployment management program 104 (see FIG. 1) creates a failure report or notification to indicate that the QA seal was not successfully generated.

Returning to step 1016, if software package deployment management program 104 (see FIG. 1) determines the QA seal is not successfully associated to the final software package in step 1016, then the Failure branch of step 1016 is taken and step 1020 is performed. In step 1020 following step 1016, software package deployment management program 104 (see FIG. 1) creates a failure report or notification to indicate that the QA seal was not successfully associated to the final software package.

Returning to step 1018, if software package deployment management program 104 (see FIG. 1) determines the software package and its associated QA seal are not successfully transferred to the release package repository 116 (see FIG. 1), then the Failure branch of step 1018 is taken and step 1020 is performed. In step 1020 following step 1018, software package deployment management program 104 (see FIG. 1) creates a failure report or notification to indicate that the software package and its associated QA seal were not successfully transferred to the release package repository 116 (see FIG. 1).

Figure 11A:
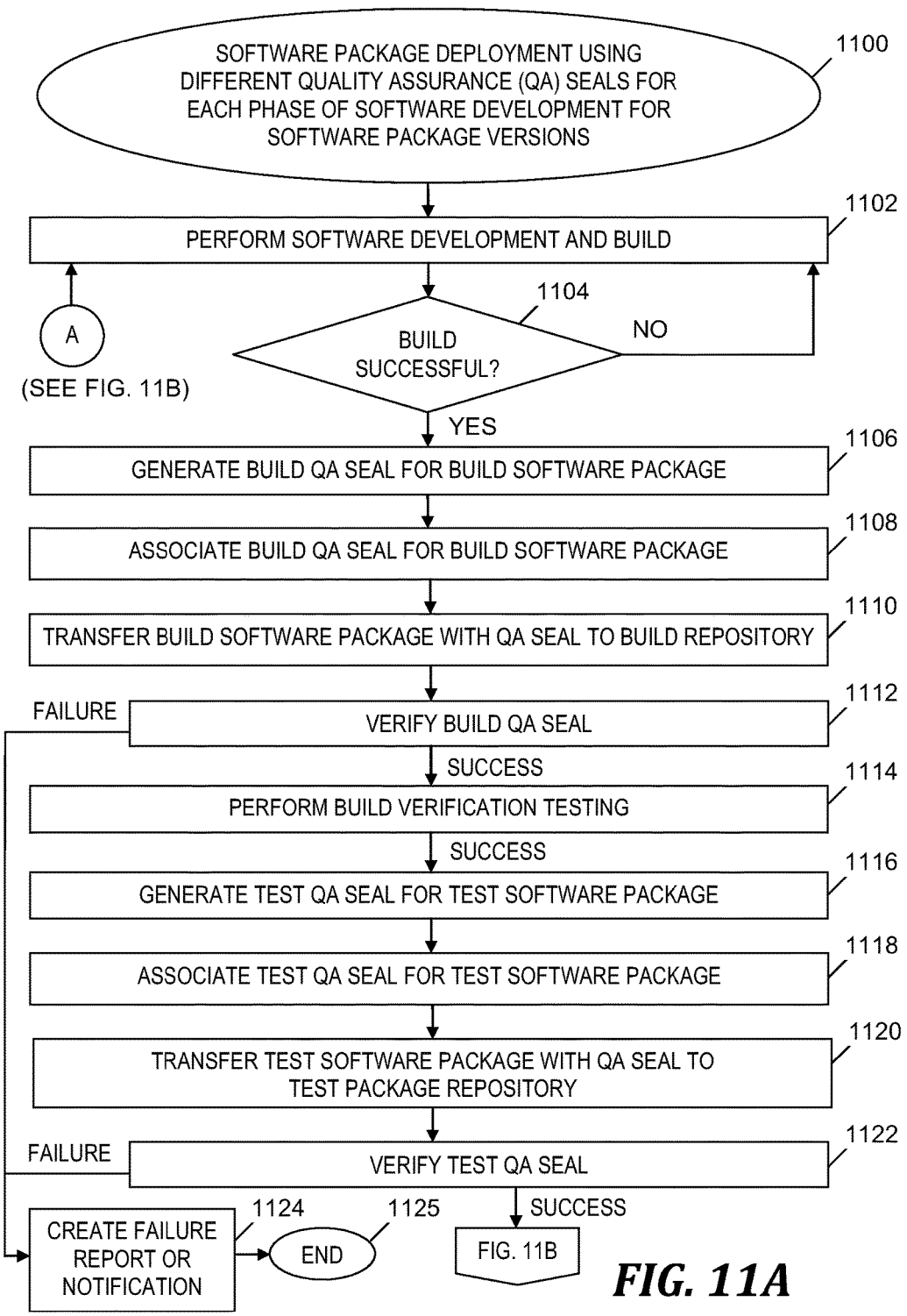
FIGS. 11A-11B depict a flowchart of a process of managing software package deployment using different QA seals for each phase of software development for software package versions, in accordance with embodiments of the present invention.
Figure 11B:
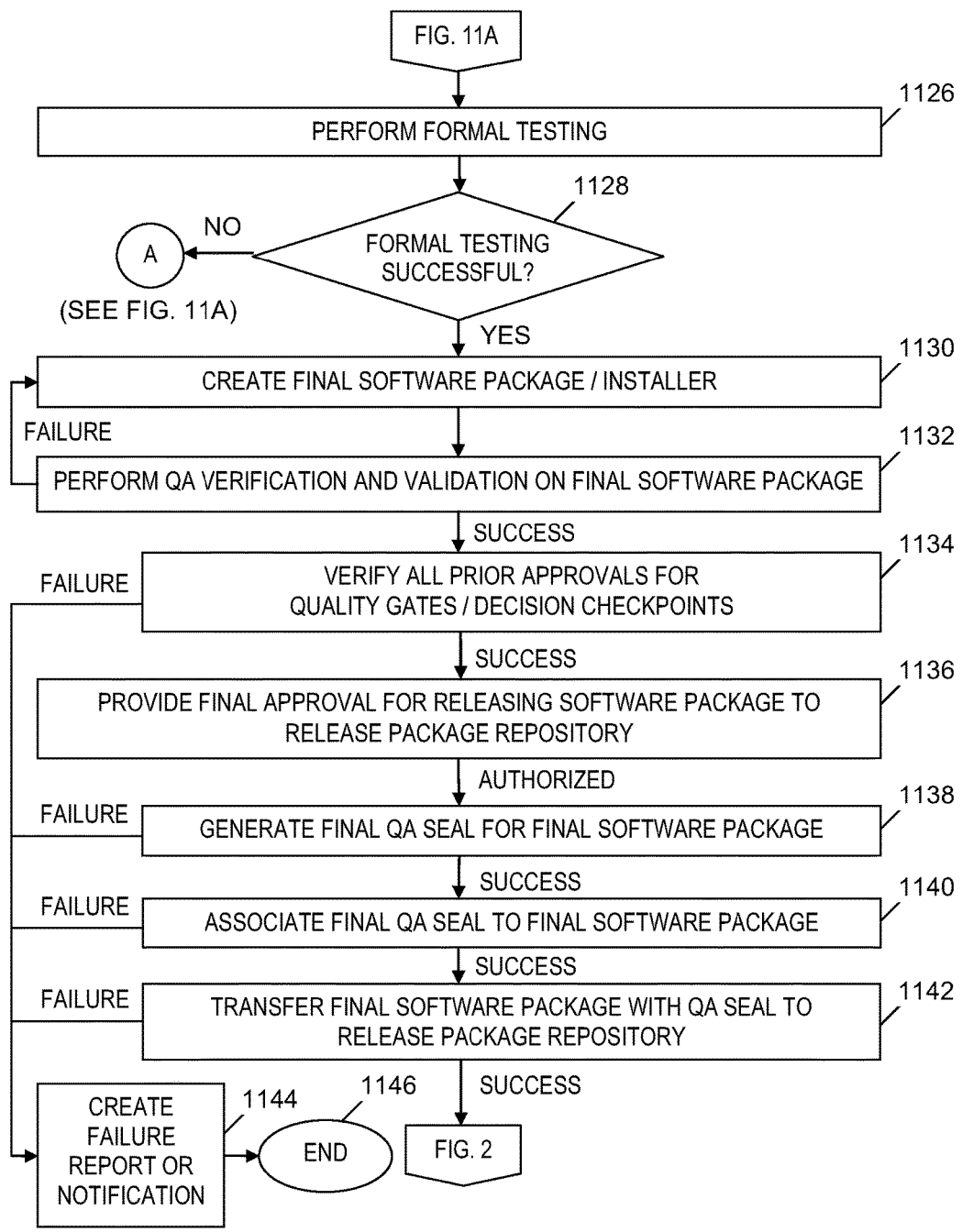

FIGS. 11A-11B depict a flowchart of a process of managing software package deployment using different QA seals for each phase of software development for software package versions, in accordance with embodiments of the present invention. The process of FIG. 11 starts at step 1100. In step 1102, computer 102 (see FIG. 1) performs the software development and build phases. In the development phase, a development team transfers source code check-in and baseline to the version control repository 110 (see FIG. 1). In the build phase, build scripts are executed and subsequently moved to the build repository 112 (see FIG. 1).

In step 1104, computer 102 (see FIG. 1) determines whether the build was successful. If step 1104 determines that the build was successful, then the Yes branch of step 1104 is taken and step 1106 is performed.

In step 1106, software package deployment management program 104 (see FIG. 1) generates a build QA seal for a build software package (i.e., a software package in the build environment). The generation of the build QA seal in step 1106 uses the process of FIG. 4.

In step 1108, software package deployment management program 104 (see FIG. 1) associates the build QA seal to the build software package using the process of FIG. 6.

In step 1110, software package deployment management program 104 (see FIG. 1) transfers the build software package with its associated build QA seal to the build repository 112 (see FIG. 1).

In step 1112, software package deployment management program 104 (see FIG. 1) verifies the build QA seal using the verification steps in the process of FIG. 7. If software package deployment management program 104 (see FIG. 1)

determines that the verification in step 1112 is successful, then the Success branch of step 1112 is taken and step 1114 is performed.

In step 1114, software package deployment management program 104 (see FIG. 1) performs build verification testing and in response to successfully verifying the build of the software package, step 1116 is performed.

In step 1116, software package deployment management program 104 (see FIG. 1) generates a test QA seal for the test software package using the process of FIG. 4.

In step 1118, software package deployment management program 104 (see FIG. 1) associates the test QA seal to the test software package using the process of FIG. 6.

In step 1120, software package deployment management program 104 (see FIG. 1) transfers the test software package with the associated test QA seal to the test package repository 114 (see FIG. 1).

In step 1122, software package deployment management program 104 (see FIG. 1) verifies the test QA seal using the verification steps in the process of FIG. 7. If software package deployment management program 104 (see FIG. 1) determines the verification in step 1122 is successful, then the Success branch of step 1122 is taken, and the process continues in FIG. 11B.

Returning to step 1104, if the build was not successful, then the No branch of step 1104 is taken, and the process loops back to step 1102, which is described above.

Returning to step 1112, if software package deployment management program 104 (see FIG. 1) determines that the verification in step 1112 is not successful, then the Failure branch of step 1112 is taken and step 1124 is performed.

In step 1124 following step 1112, software package deployment management program 104 (see FIG. 1) creates a failure report or notification that indicates the verification of the build QA seal was not successful. Following step 1124, the process ends at step 1125.

Returning to step 1122, if software package deployment management program 104 (see FIG. 1) determines the verification in step 1122 is not successful, then the Failure branch of step 1122 is taken, step 1124 is performed, and the process ends at step 1125.

In step 1124 following step 1122, software package deployment management program 104 (see FIG. 1) creates a failure report or notification that indicates the verification of the test QA seal was not successful.

Following step 1122, the process continues with step 1126 in FIG. 11B. In step 1126, computer 102 (see FIG. 1) performs formal testing of the test software package. In step 1128, computer 102 (see FIG. 1) determines whether the formal testing of the test software package is successful. If the formal testing is successful, the Yes branch of step 1128 is taken and step 1130 is performed.

In step 1130, computer 102 (see FIG. 1) creates a final software package.

In step 1132, a manual process performs QA verification and validation on the final software package created in step 1130, without utilizing any software tokens or QA seals. If the manual process determines the final software package is successfully verified and validated, then the Success branch of step 1132 is taken and step 1134 is performed.

In step 1134, a manual process verifies all prior approvals for quality gates and decision checkpoints by checking records in tools, emails, logs, etc. If the manual process determines that all the aforementioned prior approvals are successfully verified, then the Success branch of step 1134 is taken and step 1136 is performed.

In step 1136, a manual process provides final approval via email or physical signature for releasing the software package to the release package repository 116 (see FIG. 1).

In step 1138, software package deployment management program 104 (see FIG. 1) generates a final QA seal for the final software package using the process of FIG. 4. If software package deployment management program 104 (see FIG. 1) determines the final QA seal is successfully generated in step 1138, then the Success branch of step 1138 is taken and step 1140 is performed.

In step 1140, software package deployment management program 104 (see FIG. 1) associates the final QA seal to the final software package using the process of FIG. 6. If software package deployment management program 104 (see FIG. 1) determines the final QA seal is successfully associated to the final software package in step 1140, then the Success branch of step 1140 is taken and step 1142 is performed.

In step 1142, software package deployment management program 104 (see FIG. 1) transfers the final software package with the associated final QA seal to the release package repository 116 (see FIG. 1), which indicates the final software package is ready for shipment or download. If software package deployment management program 104 (see FIG. 1) determines that the transfer in step 1142 is successful, then the Success branch of step 1142 is taken and the management of the deployment of the software package continues with the process of FIG. 2.

Returning to step 1128, if computer 102 (see FIG. 1) determines that the formal testing is not successful, then the No branch of step 1128 is taken and the process loops back to step 1102 in FIG. 11A.

Returning to step 1132, if the manual process determines the final software package is not successfully verified or validated, then the Failure branch of step 1132 is taken and the process loops back to step 1130, which is described above.

Returning to step 1134, if the manual process determines that not all the aforementioned prior approvals are successfully verified, then the Failure branch of step 1134 is taken, step 1144 is performed, and the process of FIGS. 11A-11B ends at step 1146. In step 1144 following step 1134, software package deployment management program 104 (see FIG. 1) creates a failure report or notification to indicate that not all the prior approvals were successfully verified.

Returning to step 1138, if software package deployment management program 104 (see FIG. 1) determines the final QA seal is not successfully generated, then the Failure branch of step 1138 is taken, step 1144 is performed, and the process of FIGS. 11A-11B ends at step 1146. In step 1144 following step 1138, software package deployment management program 104 (see FIG. 1) creates a failure report or notification to indicate that the final QA seal was not successfully generated.

Returning to step 1140, if software package deployment management program 104 (see FIG. 1) determines the final QA seal is not successfully associated to the final software package in step 1140, then the Failure branch of step 1140 is taken, step 1144 is performed, and the process of FIGS. 11A-11B ends at step 1146. In step 1144 following step 1140, software package deployment management program 104 (see FIG. 1) creates a failure report or notification to indicate that the final QA seal was not successfully associated to the final software package.

Returning to step 1142, if software package deployment management program 104 (see FIG. 1) determines the final software package and its associated final QA seal are not successfully transferred to the release package repository 116 (see FIG. 1), then the Failure branch of step 1142 is taken, step 1144 is performed, and the process of FIGS. 11A-11B ends at step 1146. In step 1144 following step 1142, software package deployment management program 104 (see FIG. 1) creates a failure report or notification to indicate that the final software package and its associated final QA seal were not successfully transferred to the release package repository 116 (see FIG. 1).

Figure 12A:
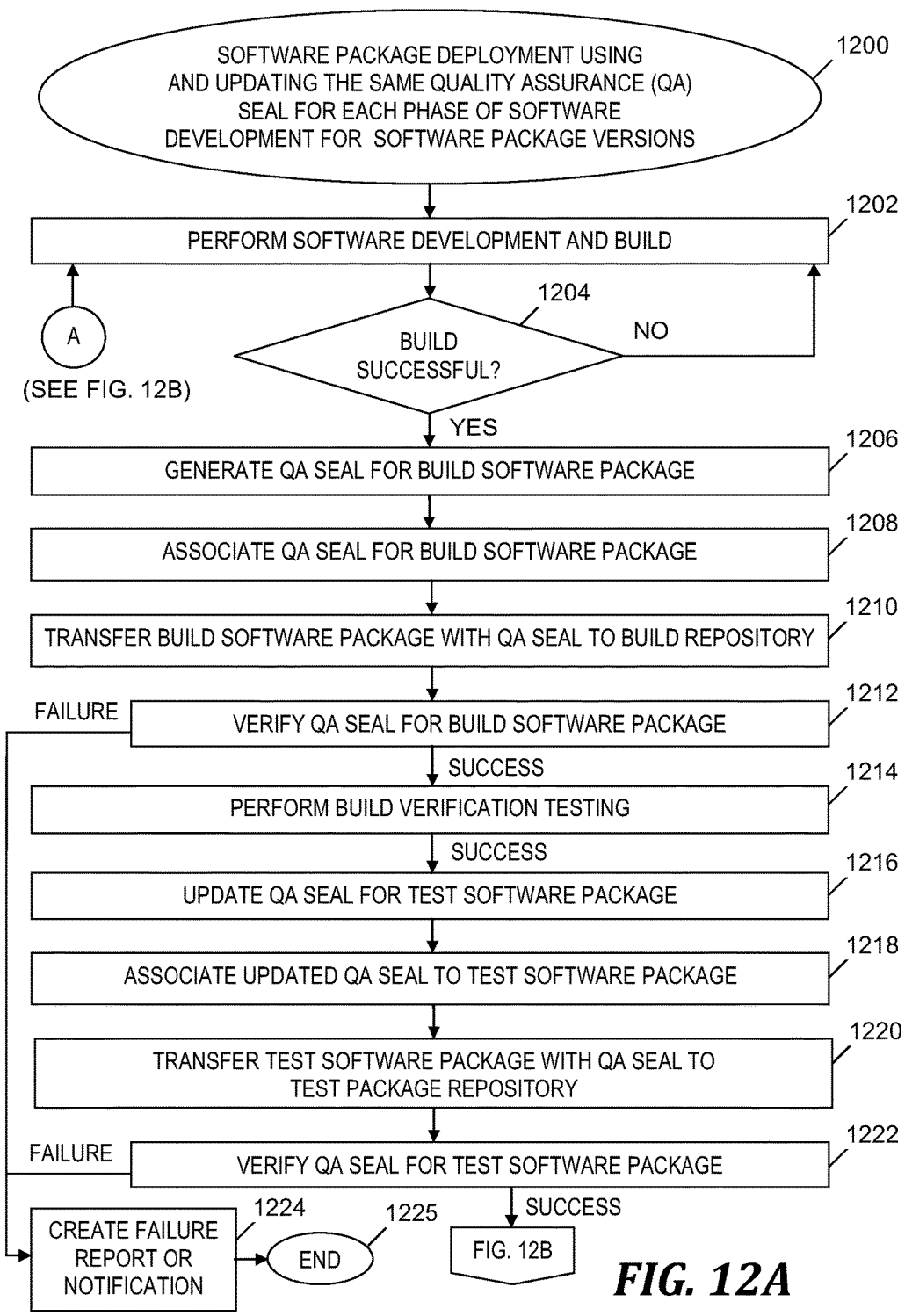
FIGS. 12A-12B depict a flowchart of a process of managing software package deployment using and updating the same QA seal for each phase of software development for software package versions, in accordance with embodiments of the present invention.
Figure 12B:
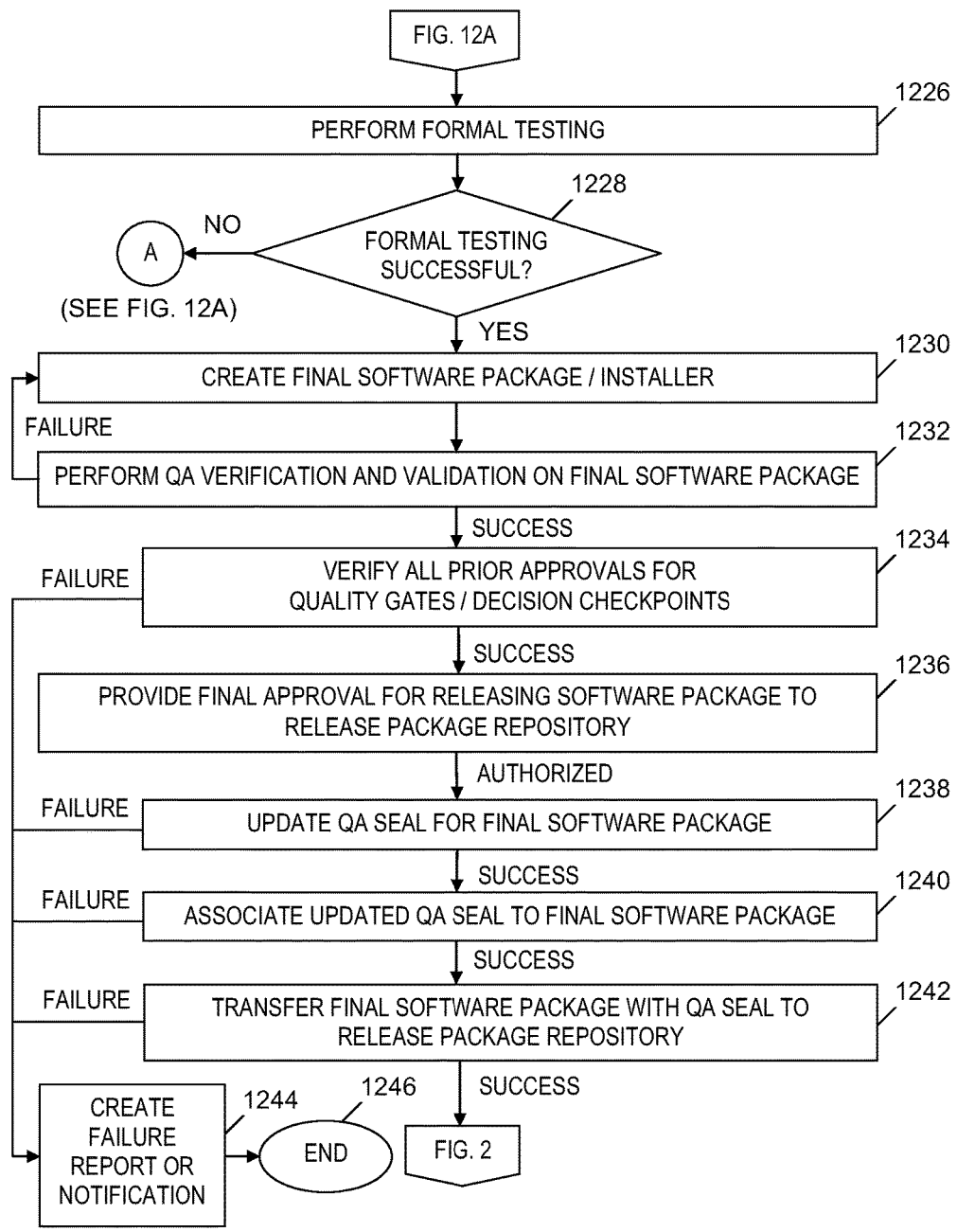

FIGS. 12A-12B depict a flowchart of a process of managing software package deployment using and updating the same QA seal for each phase of software development for software package versions, in accordance with embodiments of the present invention. The process of FIG. 12 starts at step 1200. In step 1202, computer 102 (see FIG. 1) performs the software development and build phases. In the development phase, a development team transfers source code check-in and baseline to the version control repository 110 (see FIG. 1). In the build phase, build scripts in a build software package are executed and subsequently moved to the build repository 112 (see FIG. 1).

In step 1204, computer 102 (see FIG. 1) determines whether the build was successful. If step 1204 determines that the build was successful, then the Yes branch of step 1204 is taken and step 1206 is performed.

In step 1206, software package deployment management program 104 (see FIG. 1) generates a QA seal for the build software package. The generation of the QA seal in step 1206 uses the process of FIG. 4.

In step 1208, software package deployment management program 104 (see FIG. 1) associates the QA seal to the build software package using the process of FIG. 6.

In step 1210, software package deployment management program 104 (see FIG. 1) transfers the build software package with its associated QA seal to the build repository 112 (see FIG. 1).

In step 1212, software package deployment management program 104 (see FIG. 1) verifies the QA seal using the verification steps in the process of FIG. 7. If software package deployment management program 104 (see FIG. 1) determines that the verification in step 1212 is successful, then the Success branch of step 1212 is taken and step 1214 is performed.

In step 1214, software package deployment management program 104 (see FIG. 1) performs build verification testing and in response to successfully verifying the build of the software package, step 1216 is performed.

In step 1216, software package deployment management program 104 (see FIG. 1) updates the QA seal for the test software package using the process of FIG. 5.

In step 1218, software package deployment management program 104 (see FIG. 1) associates the updated QA seal to the test software package using the process of FIG. 6.

In step 1220, software package deployment management program 104 (see FIG. 1) transfers the test software package with the associated QA seal to the test package repository 114 (see FIG. 1).

In step 1222, software package deployment management program 104 (see FIG. 1) verifies the QA seal using the verification steps in the process of FIG. 7. If software package deployment management program 104 (see FIG. 1) determines the verification in step 1222 is successful, then the Success branch of step 1222 is taken, and the process continues in FIG. 12B.

Returning to step 1204, if the build was not successful, then the No branch of step 1204 is taken, and the process loops back to step 1202, which is described above.

Returning to step 1212, if software package deployment management program 104 (see FIG. 1) determines that the verification for the build software package in step 1212 is not successful, then the Failure branch of step 1212 is taken and step 1224 is performed.

In step 1224 following step 1212, software package deployment management program 104 (see FIG. 1) creates a failure report or notification that indicates the verification of the QA seal for the build software package was not successful. Following step 1224, the process ends at step 1225.

Returning to step 1222, if software package deployment management program 104 (see FIG. 1) determines the verification for the test software package in step 1222 is not successful, then the Failure branch of step 1222 is taken, step 1224 is performed, and the process ends at step 1225.

In step 1224 following step 1222, software package deployment management program 104 (see FIG. 1) creates a failure report or notification that indicates the verification of the QA seal for the test software package was not successful.

Following step 1222, the process continues with step 1226 in FIG. 12B. In step 1226, computer 102 (see FIG. 1) performs formal testing of the test software package. In step 1228, computer 102 (see FIG. 1) determines whether the formal testing of the test software package is successful. If the formal testing is successful, the Yes branch of step 1228 is taken and step 1230 is performed.

In step 1230, computer 102 (see FIG. 1) creates a final software package.

In step 1232, a manual process performs QA verification and validation on the final software package created in step 1230, without utilizing any software tokens or QA seals. If the manual process determines the final software package is successfully verified and validated, then the Success branch of step 1232 is taken and step 1234 is performed.

In step 1234, a manual process verifies all prior approvals for quality gates and decision checkpoints by checking records in tools, emails, logs, etc. If the manual process determines that all the aforementioned prior approvals are successfully verified, then the Success branch of step 1234 is taken and step 1236 is performed.

In step 1236, a manual process provides final approval via email or physical signature for releasing the software package to the release package repository 116 (see FIG. 1).

In step 1238, software package deployment management program 104 (see FIG. 1) updates the QA seal for the final software package using the process of FIG. 5. If software package deployment management program 104 (see FIG. 1) determines the QA seal is successfully updated in step 1238, then the Success branch of step 1238 is taken and step 1240 is performed.

In step 1240, software package deployment management program 104 (see FIG. 1) associates the updated QA seal to the final software package using the process of FIG. 6. If software package deployment management program 104 (see FIG. 1) determines the updated QA seal is successfully associated to the final software package in step 1240, then the Success branch of step 1240 is taken and step 1242 is performed.

In step 1242, software package deployment management program 104 (see FIG. 1) transfers the final software package with its associated updated QA seal to the release package repository 116 (see FIG. 1)), which indicates the final software package is ready for shipment or download. If software package deployment management program 104 (see FIG. 1) determines that the transfer in step 1242 is successful, then the Success branch of step 1242 is taken and the management of the deployment of the software package continues with the process of FIG. 2.

Returning to step 1228, if computer 102 (see FIG. 1) determines that the formal testing is not successful, then the No branch of step 1228 is taken and the process loops back to step 1202 in FIG. 12A.

Returning to step 1232, if the manual process determines the final software package is not successfully verified or validated, then the Failure branch of step 1232 is taken and the process loops back to step 1230, which is described above.

Returning to step 1234, if the manual process determines that not all the aforementioned prior approvals are successfully verified, then the Failure branch of step 1234 is taken, step 1244 is performed, and the process of FIGS. 11A-11B ends at step 1246. In step 1244 following step 1234, software package deployment management program 104 (see FIG. 1) creates a failure report or notification to indicate that not all the prior approvals were successfully verified.

Returning to step 1238, if software package deployment management program 104 (see FIG. 1) determines the QA seal is not successfully updated, then the Failure branch of step 1238 is taken, step 1244 is performed, and the process of FIGS. 11A-11B ends at step 1246. In step 1244 following step 1238, software package deployment management program 104 (see FIG. 1) creates a failure report or notification to indicate that the QA seal was not successfully updated.

Returning to step 1240, if software package deployment management program 104 (see FIG. 1) determines the updated QA seal is not successfully associated to the final software package in step 1240, then the Failure branch of step 1240 is taken, step 1244 is performed, and the process of FIGS. 11A-11B ends at step 1246. In step 1244 following step 1240, software package deployment management program 104 (see FIG. 1) creates a failure report or notification to indicate that the updated QA seal was not successfully associated to the final software package.

Returning to step 1242, if software package deployment management program 104 (see FIG. 1) determines the final software package and its associated updated QA seal are not successfully transferred to the release package repository 116 (see FIG. 1), then the Failure branch of step 1242 is taken, step 1244 is performed, and the process of FIGS. 11A-11B ends at step 1246. In step 1244 following step 1242, software package deployment management program 104 (see FIG. 1) creates a failure report or notification to indicate that the final software package and its associated QA seal were not successfully transferred to the release package repository 116 (see FIG. 1).

Computer System

Figure 13:
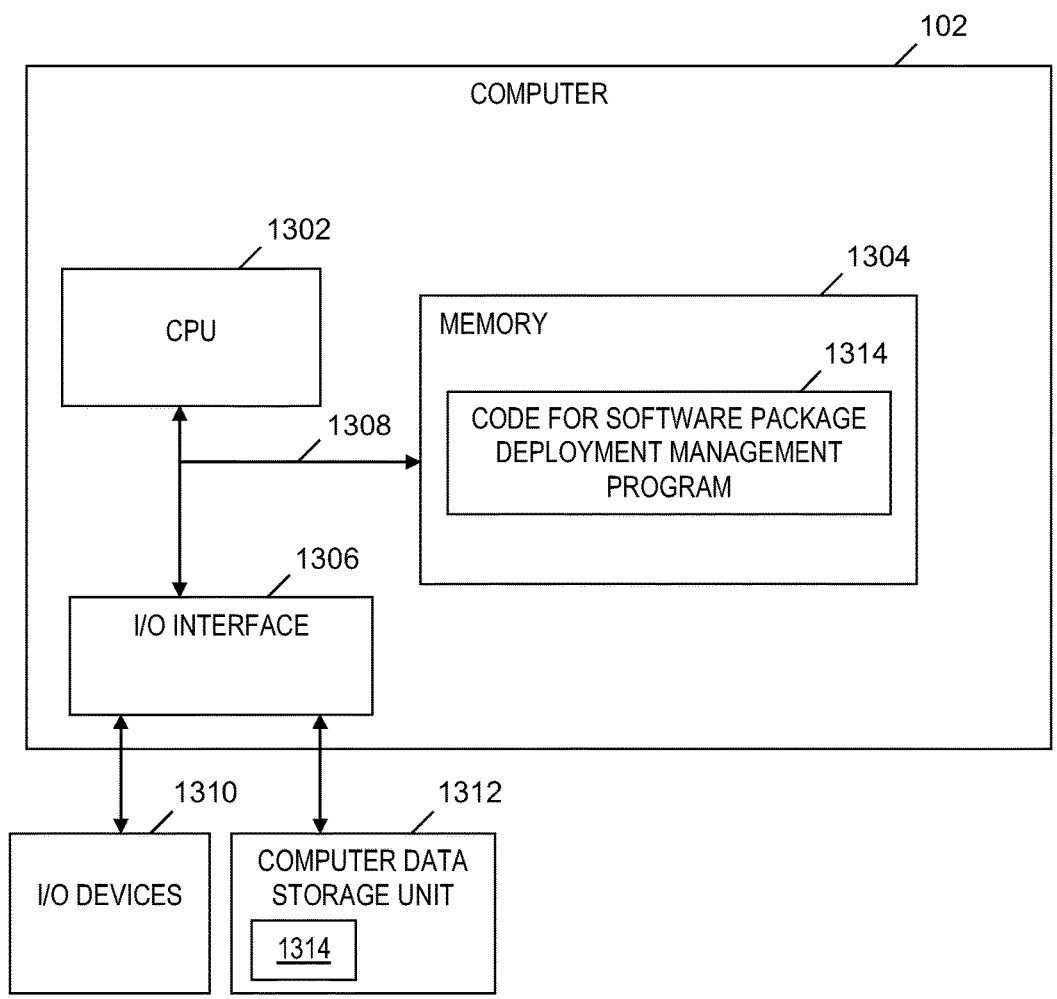
FIG. 13 is a block diagram of a computer that is included in the system of FIG. 1 and that implements the processes of FIG. 2, FIG. 3, FIG. 4, FIG. 5, FIG. 6, FIG. 7, FIG. 8, FIG. 10, FIGS. 11A-11B and FIGS. 12A-12B, in accordance with embodiments of the present invention.

FIG. 13 is a block diagram of a computer that is included in the system of FIG. 1 and that implements the processes of FIG. 2, FIG. 3, FIG. 4, FIG. 5, FIG. 6, FIG. 7, FIG. 8, FIG. 10, FIGS. 11A-11B and FIGS. 12A-12B, in accordance with embodiments of the present invention. Computer 102 generally includes a central processing unit (CPU) 1302, a memory 1304, an input/output (I/O) interface 1306, and a bus 1308. Further, computer 102 is coupled to I/O devices 1310 and a computer data storage unit 1312. CPU 1302 performs computation and control functions of computer 102, including executing instructions included in program code 1314 for software package deployment management program 104 (see FIG. 1) to perform a method of managing software package deployment, where the instructions are executed by CPU 1302 via memory 1304. CPU 1302 may include a single processing unit, or be distributed across one or more processing units in one or more locations (e.g., on a client and server).

Memory 1304 includes a known computer-readable storage medium, which is described below. In one embodiment, cache memory elements of memory 1304 provide temporary storage of at least some program code (e.g., program code 1314) in order to reduce the number of times code must be retrieved from bulk storage while instructions of the program code are executed. Moreover, similar to CPU 1302, memory 1304 may reside at a single physical location, including one or more types of data storage, or be distributed across a plurality of physical systems in various forms. Further, memory 1304 can include data distributed across, for example, a local area network (LAN) or a wide area network (WAN).

I/O interface 1306 includes any system for exchanging information to or from an external source. I/O devices 1310 include any known type of external device, including a display device (e.g., monitor), keyboard, mouse, printer, speakers, handheld device, facsimile, etc. Bus 1308 provides a communication link between each of the components in computer 102, and may include any type of transmission link, including electrical, optical, wireless, etc.

I/O interface 1306 also allows computer 102 to store information (e.g., data or program instructions such as program code 1314) on and retrieve the information from computer data storage unit 1312 or another computer data storage unit (not shown). In one embodiment, program code 1314 is stored on computer data storage unit 1312. Computer data storage unit 1312 includes a known computer-readable storage medium, which is described below. In one embodiment, computer data storage unit 1312 is a non-volatile data storage device, such as a magnetic disk drive (i.e., hard disk drive) or an optical disc drive (e.g., a CD-ROM drive which receives a CD-ROM disk).

Memory 1304 and/or storage unit 1312 may store computer program code 1314 that includes instructions that are executed by CPU 1302 via memory 1304 to manage software package deployment. Although FIG. 13 depicts memory 1304 as including program code 1314, the present invention contemplates embodiments in which memory 1304 does not include all of code 1314 simultaneously, but instead at one time includes only a portion of code 1314.

Further, memory 1304 may include other systems not shown in FIG. 13, such as an operating system (e.g., Linux®) that runs on CPU 1302 and provides control of various components within and/or connected to computer 102. Linux is a registered trademark of Linus Torvalds in the United States, other countries, or both.

In one embodiment, storage unit 1312 and/or one or more other computer data storage units (not shown) that are coupled to computer 102 stores data included repositories 106, 108, 110, 112, 114 and 116 shown in FIG. 1.

As will be appreciated by one skilled in the art, in a first embodiment, the present invention may be a system; in a second embodiment, the present invention may be a method; and in a third embodiment, the present invention may be a computer program product. A component of an embodiment of the present invention may take the form of an entirely hardware-based component, an entirely software component (including firmware, resident software, micro-code, etc.) or a component combining software and hardware sub-components that may all generally be referred to herein as a "module".

An embodiment of the present invention may take the form of a computer program product embodied in one or more computer-readable medium(s) (e.g., memory 1304 and/or computer data storage unit 1312) having computer-readable program code (e.g., program code 1314) embodied or stored thereon.

Any combination of one or more computer-readable mediums (e.g., memory 1304 and computer data storage unit 1312) may be utilized. In one embodiment, the computer-readable medium is a computer-readable storage medium. In another embodiment, the computer-readable medium is a computer-readable signal medium. As used herein, a computer-readable storage medium is not a computer-readable signal medium.

In one embodiment, the computer-readable storage medium is a physical, tangible computer-readable storage device or physical, tangible computer-readable storage apparatus that stores but does not propagate, and is not a transitory form of signal transmission. A computer-readable storage medium may include, for example, an electronic, magnetic, optical, electromagnetic, or semiconductor system, apparatus, device or any suitable combination of the foregoing. A non-exhaustive list of more specific examples of the computer-readable storage medium includes: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium is a physical, tangible storage medium that can contain or store a program (e.g., program 1314) for use by or in connection with a system, apparatus, or device for carrying out instructions in the program, and which does not propagate. The term "computer-readable storage device" does not include signal propagation media such as copper cables, optical fibers and wireless transmission media.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with a system, apparatus, or device for carrying out instructions.

Program code (e.g., program code 1314) embodied on a computer-readable medium may be transmitted using any appropriate medium, including but not limited to wireless, wireline, optical fiber cable, radio frequency (RF), etc., or any suitable combination of the foregoing.

Computer program code (e.g., program code 1314) for carrying out operations for aspects of the present invention may be written in any combination of one or more programming languages, including an object oriented programming language such as Java®, Smalltalk, C++ or the like and conventional procedural programming languages, such as the "C" programming language or similar programming languages. Java and all Java-based trademarks are trademarks or registered trademarks of Oracle and/or its affiliates. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer 102 or another computer system (not shown) having components analogous to the components of computer 102 included in FIG. 13. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to flowchart illustrations (e.g., FIG. 2, FIG. 3, FIG. 4, FIG. 5, FIG. 6, FIG. 7, FIG. 8, FIG. 10, FIGS. 11A-11B and FIGS. 12A-12B) and/or block diagrams of methods, apparatus (systems) (e.g., FIG. 1 and FIG. 13), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 1314). These computer program instructions may be provided to one or more hardware processors (e.g., CPU 1302) of a general purpose computer, special purpose computer, or other programmable data processing apparatus to produce a machine, such that the instructions, which are executed via the processor(s) of the computer or other programmable data processing apparatus, create means for implementing the functions/acts specified in the flowcharts and/or block diagram block or blocks.

These computer program instructions may also be stored in a computer-readable medium (e.g., memory 1304 or computer data storage unit 1312) that can direct a computer (e.g., computer 102), other programmable data processing apparatus, or other devices to function in a particular manner, such that the instructions (e.g., program 1314) stored in the computer-readable medium produce an article of manufacture including instructions which implement the function/act specified in the flowcharts and/or block diagram block or blocks.

The computer program instructions may also be loaded onto a computer (e.g., computer 102), other programmable data processing apparatus, or other devices to cause a series of operational steps to be performed on the computer, other programmable apparatus, or other devices to produce a computer-implemented process such that the instructions (e.g., program 1314) which are executed on the computer, other programmable apparatus, or other devices provide processes for implementing the functions/acts specified in the flowcharts and/or block diagram block or blocks.

Any of the components of an embodiment of the present invention can be deployed, managed, serviced, etc. by a service provider that offers to deploy or integrate computing infrastructure with respect to managing software package deployment. Thus, an embodiment of the present invention discloses a process for supporting computer infrastructure, where the process includes providing at least one support service for at least one of integrating, hosting, maintaining and deploying computer-readable code (e.g., program code 1314) in a computer system (e.g., computer 102) including one or more processors (e.g., CPU 1302), wherein the processor(s) carry out instructions contained in the code causing the computer system to manage software package deployment. Another embodiment discloses a process for providing at least one support service for at least one of creating, integrating, hosting, maintaining, and deploying computer-readable program code 1314 in computer 102, where program code 1314 is executed by CPU 1302 to implement the steps included in FIG. 2, FIG. 3, FIG. 4, FIG. 5, FIG. 6, FIG. 7, FIG. 8, FIG. 10, FIGS. 11A-11B and FIGS. 12A-12B.

The flowcharts in FIG. 2, FIG. 3, FIG. 4, FIG. 5, FIG. 6, FIG. 7, FIG. 8, FIG. 10, FIGS. 11A-11B and FIGS. 12A-12B and the block diagrams in FIG. 1 and FIG. 13 illustrate the architecture, functionality, and operation of possible implementations of systems, methods, and computer program products according to various embodiments of the present invention. In this regard, each block in the flowcharts or block diagrams may represent a module, segment, or portion of code (e.g., program code 1314), which includes one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of managing a deployment of a software package, the method comprising the steps of:
    a computer retrieving first and second QA seals which are embedded in a software package prior to a deployment of the software package to first and second environments;
    the computer performing a first lookup of the retrieved first QA seal in a plurality of QA seals stored in a first data repository and in response, determining that the retrieved first QA seal matches one QA seal included in the plurality of QA seals stored in the first data repository and determining the retrieved first QA seal does not match any other QA seal included in the plurality of QA seals;
    the computer performing a second lookup of the retrieved second QA seal in the plurality of QA seals stored in the first data repository and in response, determining that the retrieved second QA seal does not match any QA seal included in the plurality of QA seals stored in the first data repository;
    the computer determining that details about hardware, middleware, and applications required in the first environment which are included in one profile in the retrieved first QA seal match details of the first environment to which the software package is being deployed, the details of the first environment specifying hardware and software included in the first environment;
    based on the retrieved first QA seal matching the one QA seal included in the plurality of QA seals, the retrieved first QA seal not matching any other QA seal included in the plurality of QA seals, and the details about the hardware, middleware, and applications required in the first environment which are included in the one profile in the retrieved first QA seal matching the details of the first environment specifying the hardware and software included in the first environment, the computer determining the retrieved first QA seal indicates the software package is compatible with the first environment;
    based on the software package being compatible with the first environment, the computer generating a notification of an authorization of the deployment of the software package to the first environment; and
    based on the retrieved second QA seal not matching any QA seal included in the plurality of QA seals stored in the first data repository, the computer generating a notification indicating that the deployment of the software package to the second environment is not authorized.

2. The method of claim 1, further comprising the steps of:
    the computer determining that dependencies of hardware and software required in the deployment of the software package in the first environment are satisfied based on the first environment specified in the retrieved first QA seal; and
    determining the software package is approved for a release to the first environment based on metadata included in the retrieved first QA seal,
    wherein the step of generating the notification of the authorization of the deployment of the software package to the first environment is further based on the dependencies being satisfied and the software package being approved for the release to the first environment.

3. The method of claim 1, further comprising the step of:
    prior to the step of retrieving the first and second QA seals and subsequent to a generation of the plurality of QA seals, the computer associating the one QA seal and another QA seal included in the plurality of QA seals to the software package,
    wherein the one QA seal is a first data structure which includes (1) a first security token including an encryption mechanism that indicates whether the software package has been tampered with or otherwise changed, (2) a first profile including a name, a version, a build date, an identifier, and an author or manufacturer of a component of the software package, (3) a second profile including the details about the hardware, the middleware, and the applications required in the first environment in which the software package is permitted to be deployed, (4) a third profile including an identifier and a name of a user who is responsible for verifying contents of the software package prior to the one QA seal being embedded in the software package, (5) a first specification of one or more phases of a software development lifecycle for which the one QA seal is generated, (6) a fourth profile specifying steps of a workflow of the software development lifecycle, a name and an identifier of a reviewer of the software package, a status of an approval of the software package, and a status of the software package at key decision checkpoints, (7) a fifth profile specifying dependencies of hardware and software required in the deployment of the software package in the first environment, and (8) first metadata including a timestamp of a completion of a generation of the one QA seal, a history of modification of the one QA seal, a status of an approval of the one QA seal, and a phase of the one QA seal, and
    wherein the other QA seal is a second data structure which includes (1) the security token, (2) the first profile including the name, the version, the build date, the identifier, and the author or manufacturer of the component of the software package, (3) a sixth profile including details about hardware, middleware, and applications required in a second environment in which the software package is permitted to be deployed, (4) a seventh profile including an identifier and a name of a user who is responsible for verifying contents of the software package prior to the other QA seal being embedded in the software package, (5) a second specification of one or more phases of a software development lifecycle for which the other QA seal is generated, (6) the fourth profile specifying the steps of the workflow of the software development lifecycle, the name and the identifier of the reviewer of the software package, the status of the approval of the software package, and the status of the software package at the key decision checkpoints, (7) an eighth profile specifying the dependencies of the hardware and the software required in the deployment of the software package in the second environment, and (8) second metadata including a timestamp of a completion of a generation of the other QA seal, a history of modification of the other QA seal, a status of an approval of the other QA seal, and a phase of the other QA seal.

4. The method of claim 3, wherein the step of associating the first and second QA seals to the software package includes the steps of:
the computer retrieving the software package from a second data repository;
the computer retrieving the one QA seal and the other QA seal from the first data repository;
the computer generating and storing a first entry of the one QA seal in association with the software package and a second entry of the other QA seal in association with the software package; and
the computer updating the first and second metadata in the one and the other QA seals, respectively, to indicate that the one and the other QA seals are associated with the software package.

5. The method of claim 1, further comprising the steps of:
subsequent to a completion of a development phase of a software development lifecycle for developing the software package and prior to the step of retrieving the first and second QA seals, the computer performing a build phase of the software development lifecycle and determining the build phase is successful;
prior to the step of retrieving the first and second QA seals and based on the build phase being successful, the computer generating a third QA seal to verify the software package resulting from the build phase;
prior to the step of retrieving the first and second QA seals and in response to the step of generating the third QA seal to verify the software package resulting from the build phase, the computer associating the third QA seal to the software package resulting from the build phase;
prior to the step of retrieving the first and second QA seals and in response to the step of associating the third QA seal to the software package resulting from the build phase, the computer verifying the third QA seal associated to the software package resulting from the build phase;
prior to the step of retrieving the first and second QA seals and subsequent to the step of verifying the third QA seal associated to the software package resulting from the build phase, the computer performing a build verification testing of the software package;
prior to the step of retrieving the first and second QA seals and subsequent to the step of performing the build verification testing, the computer updating the third QA seal to test the software package resulting from the build verification testing;
prior to the step of retrieving the first and second QA seals and subsequent to the step of updating the third QA seal to test the software package resulting from the build verification testing, the computer associating the updated third QA seal to the software package resulting from the build verification testing;
prior to the step of retrieving the first and second QA seals, the computer verifying the updated third QA seal associated to the software package resulting from the build verification testing;
prior to the step of retrieving the first and second QA seals and subsequent to (1) a completion of formal testing of the software package resulting from the build verification testing, (2) a determination that the formal testing of the software package is successful, (3) a performance of a quality assurance verification and validation of the software package, (4) a verification of prior approvals for quality gates and decision checkpoints, and (5) a receipt of final approval for releasing the software package to a second data repository, the computer updating the third QA seal a second time to specify the software package as a final software package;
prior to the step of retrieving the first and second QA seals and subsequent to the step of updating the third QA seal the second time to specify the software package as the final software package, the computer associating the twice updated third QA seal to the final software package; and
prior to the step of retrieving the first and second QA seals and subsequent to the step of associating the twice updated third QA seal, the computer storing the final software package and the associated twice updated third QA seal in the second data repository.

6. The method of claim 5, wherein the step of verifying the third QA seal associated to the software package resulting from the build phase includes the steps of:
the computer determining whether the software package is encrypted and decrypting the software package in response to a determination that the software package is encrypted;
the computer determining that the software package has the third QA seal;
the computer reading the third QA seal of the software package;
the computer determining whether the third QA seal of the software package matches a QA seal in the first data repository;
in response to a determination that the third QA seal of the software package matches the QA seal in the first data repository, the computer determining whether the third QA seal of the software package matches exactly one QA seal in the first data repository; and
in response to a determination that the third QA seal of the software package matches exactly one QA seal in the first data repository, the computer determining the third QA seal of the software package is successfully verified.

7. The method of claim 1, further comprising the steps of:
subsequent to a completion of a development phase of a software development lifecycle for developing the software package and prior to the step of retrieving the software package in response to an initiation of the deployment of the software package, the computer performing a build phase of the software development lifecycle and determining the build phase is successful;

prior to the step of retrieving the first and second QA seals and based on the build phase being successful, the computer generating a third QA seal to verify the software package resulting from the build phase;

prior to the step of retrieving the first and second QA seals and in response to the step of generating the third QA seal to verify the software package resulting from the build phase, the computer associating the third QA seal to the software package resulting from the build phase;

prior to the step of retrieving the first and second QA seals and in response to the step of associating the third QA seal to the software package resulting from the build phase, the computer verifying the third QA seal associated to the software package resulting from the build phase;

prior to the step of retrieving the first and second QA seals and subsequent to the step of verifying the third QA seal associated to the software package resulting from the build phase, the computer performing a build verification testing of the software package;

prior to the step of retrieving the first and second QA seals and subsequent to the step of performing the build verification testing, the computer generating a fourth QA seal to test the software package resulting from the build verification testing;

prior to the step of retrieving the first and second QA seals and subsequent to the step of generating the fourth QA seal to test the software package resulting from the build verification testing, the computer associating the fourth QA seal to the software package resulting from the build verification testing;

prior to the step of retrieving the first and second QA seals, the computer verifying the fourth QA seal associated to the software package resulting from the build verification testing;

prior to the step of retrieving the first and second QA seals and subsequent to (1) a completion of formal testing of the software package resulting from the build verification testing, (2) a determination that the formal testing of the software package is successful, (3) a performance of a quality assurance verification and validation of the software package, (4) a verification of prior approvals for quality gates and decision checkpoints, and (5) a receipt of final approval for releasing the software package to the second data repository, the computer generating a fifth QA seal to specify the software package as a final software package;

prior to the step of retrieving the first and second QA seals and subsequent to the step of generating the fifth QA seal to specify the software package as the final software package, the computer associating the fifth QA seal to the final software package; and prior to the step of retrieving the first and second QA seals and subsequent to the step of associating the fifth QA seal, the computer storing the final software package and the associated fifth QA seal in the second data repository.

8. The method of claim 1, further comprising the step of: providing at least one support service for at least one of creating, integrating, hosting, maintaining, and deploying computer-readable program code in the computer, the program code being executed by a processor to implement the steps of retrieving the first and second QA seals, performing the first lookup of the retrieved first QA seal, determining that the retrieved first QA seal matches the one QA seal, determining the retrieved first QA seal does not match any other QA seal, performing the second lookup of the retrieved second QA seal, determining that the retrieved second QA seal does not match any QA seal, determining that the details about the hardware, middleware, and applications required in the first environment match the details of the first environment, determining the retrieved first QA seal indicates the software package is compatible with the first environment, generating the notification of the authorization of the deployment of the software package to the first environment, and generating the notification indicating that the deployment of the software package to the second environment is not authorized.

9. A computer system comprising:
a central processing unit (CPU);
a memory coupled to the CPU; and
a computer-readable storage medium coupled to the CPU, the storage medium containing instructions that are executed by the CPU via the memory to implement a method of managing a deployment of a software package, the method comprising the steps of:
the computer system retrieving first and second QA seals which are embedded in a software package prior to a deployment of the software package to first and second environments;
the computer system performing a first lookup of the retrieved first QA seal in a plurality of QA seals stored in a first data repository and in response, determining that the retrieved first QA seal matches one QA seal included in the plurality of QA seals stored in the first data repository and determining the retrieved first QA seal does not match any other QA seal included in the plurality of QA seals;
the computer system performing a second lookup of the retrieved second QA seal in the plurality of QA seals stored in the first data repository and in response, determining that the retrieved second QA seal does not match any QA seal included in the plurality of QA seals stored in the first data repository;
the computer system determining that details about hardware, middleware, and applications required in the first environment which are included in one profile in the retrieved first QA seal match details of the first environment to which the software package is being deployed, the details of the first environment specifying hardware and software included in the first environment;
based on the retrieved first QA seal matching the one QA seal included in the plurality of QA seals, the retrieved first QA seal not matching any other QA seal included in the plurality of QA seals, and the details about the hardware, middleware, and applications required in the first environment which are included in the one profile in the retrieved first QA seal matching the details of the first environment specifying the hardware and software included in the first environment, the computer system determining the retrieved first QA seal indicates the software package is compatible with the first environment;
based on the software package being compatible with the first environment, the computer system generating a notification of an authorization of the deployment of the software package to the first environment; and based on the retrieved second QA seal not matching any QA seal included in the plurality of QA seals stored in the first data repository, the computer system generating a notification indicating that the deployment of the software package to the second environment is not authorized.

10. The computer system of claim 9, wherein the method further comprises the steps of:

the computer system determining that dependencies of hardware and software required in the deployment of the software package in the first environment are satisfied based on the first environment specified in the retrieved first QA seal; and determining the software package is approved for a release to the first environment based on metadata included in the retrieved first QA seal, wherein the step of generating the notification of the authorization of the deployment of the software package to the first environment is further based on the dependencies being satisfied and the software package being approved for the release to the first environment.

11. The computer system of claim 9, wherein the method further comprises the step of:

prior to the step of retrieving the first and second QA seals and subsequent to a generation of the plurality of QA seals, the computer system associating the one QA seal and another QA seal included in the plurality of QA seals to the software package, wherein the one QA seal is a first data structure which includes (1) a first security token including an encryption mechanism that indicates whether the software package has been tampered with or otherwise changed, (2) a first profile including a name, a version, a build date, an identifier, and an author or manufacturer of a component of the software package, (3) a second profile including the details about the hardware, the middleware, and the applications required in the first environment in which the software package is permitted to be deployed, (4) a third profile including an identifier and a name of a user who is responsible for verifying contents of the software package prior to the one QA seal being embedded in the software package, (5) a first specification of one or more phases of a software development lifecycle for which the one QA seal is generated, (6) a fourth profile specifying steps of a workflow of the software development lifecycle, a name and an identifier of a reviewer of the software package, a status of an approval of the software package, and a status of the software package at key decision checkpoints, (7) a fifth profile specifying dependencies of hardware and software required in the deployment of the software package in the first environment, and (8) first metadata including a timestamp of a completion of a generation of the one QA seal, a history of modification of the one QA seal, a status of an approval of the one QA seal, and a phase of the one QA seal, and wherein the other QA seal is a second data structure which includes (1) the security token, (2) the first profile including the name, the version, the build date, the identifier, and the author or manufacturer of the component of the software package, (3) a sixth profile including details about hardware, middleware, and applications required in a second environment in which the software package is permitted to be deployed, (4) a seventh profile including an identifier and a name of a user who is responsible for verifying contents of the software package prior to the other QA seal being embedded in the software package, (5) a second specification of one or more phases of a software development lifecycle for which the other QA seal is generated, (6) the fourth profile specifying the steps of the workflow of the software development lifecycle, the name and the identifier of the reviewer of the software package, the status of the approval of the software package, and the status of the software package at the key decision checkpoints, (7) an eighth profile specifying the dependencies of the hardware and the software required in the deployment of the software package in the second environment, and (8) second metadata including a timestamp of a completion of a generation of the other QA seal, a history of modification of the other QA seal, a status of an approval of the other QA seal, and a phase of the other QA seal.

12. The computer system of claim 11, wherein the step of associating the first and second QA seals to the software package includes the steps of:

the computer system retrieving the software package from a second data repository;

the computer system retrieving the one QA seal and the other QA seal from the first data repository;

the computer system generating and storing a first entry of the one QA seal in association with the software package and a second entry of the other QA seal in association with the software package; and the computer system updating the first and second metadata in the one and the other QA seals, respectively, to indicate that the one and the other QA seals are associated with the software package.

13. The computer system of claim 9, wherein the method further comprises the steps of:

subsequent to a completion of a development phase of a software development lifecycle for developing the software package and prior to the step of retrieving the first and second QA seals, the computer system performing a build phase of the software development lifecycle and determining the build phase is successful;

prior to the step of retrieving the first and second QA seals and based on the build phase being successful, the computer system generating a third QA seal to verify the software package resulting from the build phase;

prior to the step of retrieving the first and second QA seals and in response to the step of generating the third QA seal to verify the software package resulting from the build phase, the computer system associating the third QA seal to the software package resulting from the build phase;

prior to the step of retrieving the first and second QA seals and in response to the step of associating the third QA seal to the software package resulting from the build phase, the computer system verifying the third QA seal associated to the software package resulting from the build phase;

prior to the step of retrieving the first and second QA seals and subsequent to the step of verifying the third QA seal associated to the software package resulting from the build phase, the computer system performing a build verification testing of the software package;

prior to the step of retrieving the first and second QA seals and subsequent to the step of performing the build verification testing, the computer system updating the third QA seal to test the software package resulting from the build verification testing;

prior to the step of retrieving the first and second QA seals and subsequent to the step of updating the third QA seal to test the software package resulting from the build verification testing, the computer system associating the updated third QA seal to the software package resulting from the build verification testing;

prior to the step of retrieving the first and second QA seals, the computer system verifying the updated third QA seal associated to the software package resulting from the build verification testing;

prior to the step of retrieving the first and second QA seals and subsequent to (1) a completion of formal testing of the software package resulting from the build verification testing, (2) a determination that the formal testing of the software package is successful, (3) a performance of a quality assurance verification and validation of the software package, (4) a verification of prior approvals for quality gates and decision checkpoints, and (5) a receipt of final approval for releasing the software package to a second data repository, the computer system updating the third QA seal a second time to specify the software package as a final software package;

prior to the step of retrieving the first and second QA seals and subsequent to the step of updating the third QA seal the second time to specify the software package as the final software package, the computer system associating the twice updated third QA seal to the final software package; and prior to the step of retrieving the first and second QA seals and subsequent to the step of associating the twice updated third QA seal, the computer system storing the final software package and the associated twice updated third QA seal in the second data repository.

14. The computer system of claim 13, wherein the step of verifying the third QA seal associated to the software package resulting from the build phase includes the steps of:

the computer system determining whether the software package is encrypted and decrypting the software package in response to a determination that the software package is encrypted;

the computer system determining that the software package has the third QA seal;

the computer system reading the third QA seal of the software package;

the computer system determining whether the third QA seal of the software package matches a QA seal in the first data repository;

in response to a determination that the third QA seal of the software package matches the QA seal in the first data repository, the computer system determining whether the third QA seal of the software package matches exactly one QA seal in the first data repository; and in response to a determination that the third QA seal of the software package matches exactly one QA seal in the first data repository, the computer system determining the third QA seal of the software package is successfully verified.

15. A computer program product, comprising:

a computer-readable storage medium which is not a signal or a signal propagation medium; and a computer-readable program code stored in the computer-readable storage medium, the computer-readable program code containing instructions that are executed by a central processing unit (CPU) of a computer system to implement a method of managing a deployment of a software package, the method comprising the steps of:

the computer system retrieving first and second QA seals which are embedded in a software package prior to a deployment of the software package to first and second environments;

the computer system performing a first lookup of the retrieved first QA seal in a plurality of QA seals stored in a first data repository and in response, determining that the retrieved first QA seal matches one QA seal included in the plurality of QA seals stored in the first data repository and determining the retrieved first QA seal does not match any other QA seal included in the plurality of QA seals;

the computer system performing a second lookup of the retrieved second QA seal in the plurality of QA seals stored in the first data repository and in response, determining that the retrieved second QA seal does not match any QA seal included in the plurality of QA seals stored in the first data repository;

the computer system determining that details about hardware, middleware, and applications required in the first environment which are included in one profile in the retrieved first QA seal match details of the first environment to which the software package is being deployed, the details of the first environment specifying hardware and software included in the first environment;

based on the retrieved first QA seal matching the one QA seal included in the plurality of QA seals, the retrieved first QA seal not matching any other QA seal included in the plurality of QA seals, and the details about the hardware, middleware, and applications required in the first environment which are included in the one profile in the retrieved first QA seal matching the details of the first environment specifying the hardware and software included in the first environment, the computer system determining the retrieved first QA seal indicates the software package is compatible with the first environment;

based on the software package being compatible with the first environment, the computer system generating a notification of an authorization of the deployment of the software package to the first environment; and based on the retrieved second QA seal not matching any QA seal included in the plurality of QA seals stored in the first data repository, the computer system generating a notification indicating that the deployment of the software package to the second environment is not authorized.

16. The computer program product of claim 15, wherein the method further comprises the steps of:

the computer system determining that dependencies of hardware and software required in the deployment of the software package in the first environment are satisfied based on the first environment specified in the retrieved first QA seal; and determining the software package is approved for a release to the first environment based on metadata included in the retrieved first QA seal, wherein the step of generating the notification of the authorization of the deployment of the software package to the first environment is further based on the dependencies being satisfied and the software package being approved for the release to the first environment.

17. The computer program product of claim 15, wherein the method further comprises the step of:

prior to the step of retrieving the first and second QA seals and subsequent to a generation of the plurality of QA seals, the computer system associating the one QA seal and another QA seal included in the plurality of QA seals to the software package, wherein the one QA seal is a first data structure which includes (1) a first security token including an encryption mechanism that indicates whether the software package has been tampered with or otherwise changed, (2) a first profile including a name, a version, a build date, an identifier, and an author or manufacturer of a component of the software package, (3) a second profile including the details about the hardware, the middleware, and the applications required in the first environment in which the software package is permitted to be deployed, (4) a third profile including an identifier and a name of a user who is responsible for verifying contents of the software package prior to the one QA seal being embedded in the software package, (5) a first specification of one or more phases of a software development lifecycle for which the one QA seal is generated, (6) a fourth profile specifying steps of a workflow of the software development lifecycle, a name and an identifier of a reviewer of the software package, a status of an approval of the software package, and a status of the software package at key decision checkpoints, (7) a fifth profile specifying dependencies of hardware and software required in the deployment of the software package in the first environment, and (8) first metadata including a timestamp of a completion of a generation of the one QA seal, a history of modification of the one QA seal, a status of an approval of the one QA seal, and a phase of the one QA seal, and wherein the other QA seal is a second data structure which includes (1) the security token, (2) the first profile including the name, the version, the build date, the identifier, and the author or manufacturer of the component of the software package, (3) a sixth profile including details about hardware, middleware, and applications required in a second environment in which the software package is permitted to be deployed, (4) a seventh profile including an identifier and a name of a user who is responsible for verifying contents of the software package prior to the other QA seal being embedded in the software package, (5) a second specification of one or more phases of a software development lifecycle for which the other QA seal is generated, (6) the fourth profile specifying the steps of the workflow of the software development lifecycle, the name and the identifier of the reviewer of the software package, the status of the approval of the software package, and the status of the software package at the key decision checkpoints, (7) an eighth profile specifying the dependencies of the hardware and the software required in the deployment of the software package in the second environment, and (8) second metadata including a timestamp of a completion of a generation of the other QA seal, a history of modification of the other QA seal, a status of an approval of the other QA seal, and a phase of the other QA seal.

18. The computer program product of claim 17, wherein the step of associating the first and second QA seals to the software package includes the steps of:

the computer system retrieving the software package from a second data repository;

the computer system retrieving the one QA seal and the other QA seal from the first data repository;

the computer system generating and storing a first entry of the one QA seal in association with the software package and a second entry of the other QA seal in association with the software package; and the computer system updating the first and second metadata in the one and the other QA seals, respectively, to indicate that the one and the other QA seals are associated with the software package.

19. The computer program product of claim 15, wherein the method further comprises the steps of:

subsequent to a completion of a development phase of a software development lifecycle for developing the software package and prior to the step of retrieving the first and second QA seals, the computer system performing a build phase of the software development lifecycle and determining the build phase is successful;

prior to the step of retrieving the first and second QA seals and based on the build phase being successful, the computer system generating a third QA seal to verify the software package resulting from the build phase;

prior to the step of retrieving the first and second QA seals and in response to the step of generating the third QA seal to verify the software package resulting from the build phase, the computer system associating the third QA seal to the software package resulting from the build phase;

prior to the step of retrieving the first and second QA seals and in response to the step of associating the third QA seal to the software package resulting from the build phase, the computer system verifying the third QA seal associated to the software package resulting from the build phase;

prior to the step of retrieving the first and second QA seals and subsequent to the step of verifying the third QA seal associated to the software package resulting from the build phase, the computer system performing a build verification testing of the software package;

prior to the step of retrieving the first and second QA seals and subsequent to the step of performing the build verification testing, the computer system updating the third QA seal to test the software package resulting from the build verification testing;

prior to the step of retrieving the first and second QA seals and subsequent to the step of updating the third QA seal to test the software package resulting from the build verification testing, the computer system associating the updated third QA seal to the software package resulting from the build verification testing;

prior to the step of retrieving the first and second QA seals, the computer system verifying the updated third QA seal associated to the software package resulting from the build verification testing;

prior to the step of retrieving the first and second QA seals and subsequent to (1) a completion of formal testing of the software package resulting from the build verification testing, (2) a determination that the formal testing of the software package is successful, (3) a performance of a quality assurance verification and validation of the software package, (4) a verification of prior approvals for quality gates and decision checkpoints, and (5) a receipt of final approval for releasing the software package to a second data repository, the computer system updating the third QA seal a second time to specify the software package as a final software package;

prior to the step of retrieving the first and second QA seals and subsequent to the step of updating the third QA seal the second time to specify the software package as the final software package, the computer system associating the twice updated third QA seal to the final software package; and prior to the step of retrieving the first and second QA seals and subsequent to the step of associating the twice updated third QA seal, the computer system storing the final software package and the associated twice updated third QA seal in the second data repository.

20. The computer program product of claim 19, wherein the step of verifying the third QA seal associated to the software package resulting from the build phase includes the steps of:

the computer system determining whether the software package is encrypted and decrypting the software package in response to a determination that the software package is encrypted;

the computer system determining that the software package has the third QA seal;

the computer system reading the third QA seal of the software package;

the computer system determining whether the third QA seal of the software package matches a QA seal in the first data repository;

in response to a determination that the third QA seal of the software package matches the QA seal in the first data repository, the computer system determining whether the third QA seal of the software package matches exactly one QA seal in the first data repository; and in response to a determination that the third QA seal of the software package matches exactly one QA seal in the first data repository, the computer system determining the third QA seal of the software package is successfully verified.

* * * * *